United States Patent [19]
Kurita

[11] Patent Number: 5,903,535
[45] Date of Patent: May 11, 1999

[54] DISC CARTRIDGE LOADING MECHANISM WITH AN OSCILLATING GEAR AND TWO LEVERS CONTROLLING A COVER AND THE EJECTING OF A DISC FROM THE DISC PLAYER

[75] Inventor: Kazuhito Kurita, Kanagawa, Japan

[73] Assignee: Sony Corporation, Tokyo, Japan

[21] Appl. No.: 09/057,010

[22] Filed: Apr. 7, 1998

Related U.S. Application Data

[62] Division of application No. 08/793,452, Mar. 5, 1997.

[51] Int. Cl.⁶ .................................................. G11B 33/02
[52] U.S. Cl. ............................................................ 369/77.2
[58] Field of Search ................................ 369/75.1, 75.2, 369/77.1, 77.2; 360/97.02, 98.05, 98.07, 99.04, 99.08

[56] References Cited

U.S. PATENT DOCUMENTS

| | | | |
|---|---|---|---|
| 5,493,551 | 2/1996 | Kido | 369/77.1 |
| 5,504,730 | 4/1996 | Kanada | 369/75.1 |
| 5,532,995 | 7/1996 | Choi | 369/77.2 |

Primary Examiner—George J. Letscher
Attorney, Agent, or Firm—Jay H. Maioli

[57] ABSTRACT

A disc loading and ejecting mechanism for a disc recording/playback device includes a mechanism for controlling the opening of the cover of the device and the ejecting of a disc having an oscillating gear that cooperates selectively with two rack gears on respective levers to prohibit ejection of a disc when a signal is being recorded or reproduced. The oscillating gear is indirectly driven by the motor used for the disc rotation mechanism, so that disc ejection is prohibited when the motor is rotated in the record/playback direction and ejection is enabled when the motor is reversely rotated.

2 Claims, 13 Drawing Sheets

DISC CARTRIDGE LOADING MECHANISM WITH AN OSCILLATING GEAR AND TWO LEVERS CONTROLLING A COVER AND THE EJECTING OF A DISC FROM THE DISC PLAYER

This is a division of prior application Ser. No. 08/793,452 filed Mar. 5, 1997.

TECHNICAL FIELD

The present invention relates to a disc ejecting apparatus for ejecting a disc installed in a disc rotating mechanism of a disc recorder and/or reproducer and a disc cartridge loading apparatus provided with this ejecting apparatus. Particularly, the present invention relates to an ejecting apparatus for ejecting a disc utilizing the driving force of a motor constituting a disc rotating mechanism and a disc cartridge loading apparatus.

BACKGROUND ART

Heretofore, a recorder and/or reproducer using an optical disc and a magneto-optical disc for a recording medium of a signal is used.

This recorder and/or reproducer is provided with a disc rotating mechanism for rotating an optical disc housed in a disc cartridge. This disc rotating mechanism is provided with a disc table on which a disc is set and a spindle motor for rotating this disc table. The disc table is provided with a centering member for fitting into a center hole provided in the center of an optical disc and a magnet located on the face where a disc is set for attracting a magnetic plate attached to cover the center hole of a disc. An optical disc is set by fitting its center hole to a centering member and attracting a magnetic plate by a magnet so that the disc can be rotated integrally with a disc table. This disc table is integrated with the driving shaft of a spindle motor and is rotated by driving the spindle motor.

An optical pickup that rotates integrally with the disc table constituting recording and/or reproducing means for recording and/or reproducing a signal on an optical disc set on a disc table is provided to the recorder and/or reproducer. This optical pickup scans the signal recorded area of an optical disc by feeding it in the radial direction of the rotated optical disc using a feeding mechanism.

A loading apparatus provided with an ejecting mechanism for setting an optical disc on the disc table of the disc rotating mechanism and ejecting the optical disc set on this disc table is provided to the recorder and/or reproducer using a disc for a recording medium.

In the meantime, in the recorder and/or reproducer using an optical disc on which a signal can be recorded as a recording medium, information such as the address of a recorded signal is placed on the catalog after a signal is recorded. Therefore, if an optical disc set on the disc table is ejected while a signal is being recorded, a signal is not recorded precisely.

If an optical disc set on the disc table is ejected while a signal recorded on the optical disc is being reproduced, smooth reproduction may not be performed the next time a signal is reproduced.

Further, if an optical disc set on the disc table is ejected during recording and/or reproducing a signal on the optical disc, the optical disc may collide with the optical pickup, and the optical disc and the optical pickup may be damaged.

Therefore, an ejection mechanism wherein an optical disc set on the disc table is prohibited from being ejected during recording and/or reproducing a signal is provided to the recorder and/or reproducer using an optical disc as a recording medium.

For this ejection mechanism, the one constituted as shown in FIG. 1 is proposed. This ejection mechanism is applied to a disc recorder/reproducer for recording and reproducing a signal using an optical disc as a recording medium and is provided with first and second ejection levers 117 and 118 respectively. These first and second ejection levers 117 and 118 are attached along one side of the body 100 of a disc recorder/reproducer so that they can be moved. A grip 116 is provided to the first ejection lever 117 so that this lever 117 can be readily moved. When the first ejection lever 117 is moved along one side of the body 100 in the direction shown by an arrow c in FIG. 1, the second ejection lever 118 is moved in the direction shown by an arrow d in FIG. 1 via a transmission lever 111 for transmitting operating physical force between the first and second ejection levers 117 and 118.

As shown in FIG. 1, a turned part 115 located at the end of the transmission lever 111 for transmitting the operating physical force of the first ejection lever 117 to the second ejection lever 118 is put between the first and second ejection levers 117 and 118. When the first ejection lever 117 is moved in the direction shown by the arrow c in FIG. 1, the turned part 115 is pressed and the transmission lever 111 is turned on the side of the second ejection lever 118. The second ejection lever 118 is moved in the direction shown by the arrow d in FIG. 1 via the turned part 115.

In the meantime, the second ejection lever 118 controls the opening and closing of a cover turned in synchronization with a cartridge holder into/in which a disc cartridge housing an optical disc is inserted and held. That is, the cover is turned in synchronization with the cartridge holder, and when the cartridge holder is turned to a position in which a disc cartridge is to be set on the side of the body, the cover is turned so that it closes a part in which the cartridge is set and is locked by the second ejection lever 118, and a closed state is held. When the second ejection lever 118 is moved in the direction shown by the arrow d in FIG. 1, the lock of the cover is released and the cover is turned in the direction for opening the part in which the cartridge is set. This cover is turned in the above-mentioned direction by a twisted coil spring provided on the turning shaft of the cover.

The transmission lever 111 is arranged on an ejection regulating lever 106 arranged in the body so that the transmission lever can be swung and the turned part 115 which is at the end of the transmission lever 111 is protruded from one side of a housing between the first and second ejection levers 117 and 118. This transmission lever 111 is arranged on the ejection regulating lever 106 with first and second supporting shafts 109a and 109b, respectively, planted on the ejection regulating lever 106 and respectively inserted into a first support hole 110a with a longer diameter in the longitudinal direction and a second support hole 110b with a large diameter. The transmission lever 111 can be moved in the direction shown by an arrow b in FIG. 1 in the range of the first and second support holes 110a and 110b and is turned in the range of the second support hole 110b with a large diameter. The first supporting shaft 109a is inserted into the first support hole 110a formed as a long hole in the center. The transmission lever 111 is pressed and moved in the direction shown by the arrow b in FIG. 1 in which the turned part 115 is protruded between the first and second ejection levers 117 and 118, by a tension spring 114 stretched between a spring fitting piece 113 protruded on one side of this lever 111 and a spring fitting piece 112 protruded on one side of the ejection regulating lever 106. The ejection regulating lever 106 on which the transmission lever 111 is arranged is supported so that the ejection regulating lever can be moved in the directions shown by arrows $a_1$ and $a_2$ in FIG. 1 for advancing or moving back to the first and second ejection levers 117 and 118 with first and second supporting shafts 107a and 107b planted on the body of the ejection regulating lever 106 respectively inserted into first and second support holes 108a and 108b with a longer diameter in the moving direction of the transmission lever 111. A rack 105 engaged with a driving gear 104 rotated by a drive motor 101 is formed on one side of the base end of the ejection regulating lever 106 on which this transmission lever 111 is arranged.

A spur gear 119 engaged with the rack 105 and a worm wheel 121 are provided on the same axis as the driving gear 104. A worm gear 103 to which the driving force of the drive motor 101 is transmitted is engaged with the worm wheel 121. This worm gear 103 and the drive motor 101 are coupled by engaging a spur gear 120 attached at the base end of the worm gear 103 with a spur gear 102 attached to the driving shaft 101a of the drive motor 101.

While an optical disc is set in the disc rotating mechanism of a recorder/reproducer to which the ejection mechanism as described above is applied and a signal is being recorded or reproduced on this optical disc, the drive motor 101 moves the ejection regulating lever 106 in the direction shown by the arrow $a_2$ in FIG. 1 and moves back the turned part 115 which is the end of the transmission lever 111 from between the first and second ejection levers 117 and 118. Even if the first ejection lever 117 is moved in the direction shown by the arrow c in FIG. 1, the second ejection lever 118 is not moved. Because the range in which the first ejection lever 117 is moved in the direction shown by the arrow c in FIG. 1 is regulated and the ejection lever 117 is not moved by distance enough to press the second ejection lever 118 when the turned part 115 is not put between the ejection levers. As operation for moving the second ejection lever 118 is regulated, the cartridge holder is turned to a position in which a cartridge is set and operation for releasing the lock of the cover turned in a position for closing and locking part where a cartridge is set is regulated. As a result, operation for opening the cover is regulated and operation for ejecting the optical disc set in the disc rotating mechanism is regulated.

When placing the information of a recorded signal on the catalog is completed or the reproduction of a specified and desired signal recorded on an optical disc is completed after recording a signal on an optical disc is finished, the drive motor 101 is driven to move the ejection regulating lever 106 in the direction shown by the arrow $a_1$ in FIG. 1. As shown in FIG. 1, when the ejection regulating lever 106 is moved in the direction shown by the arrow $a_1$ in FIG. 1, the turned part 115 which is the end of the transmission lever 111 is protruded between the first and second ejection levers 117 and 118. When the first ejection lever 117 is moved in the direction shown by the arrow c in FIG. 1, the transmission lever 111 is turned, the second ejection lever 118 is moved in the direction shown by the arrow d in FIG. 1 by this transmission lever 111, the lock of the cover which is locked in a position for closing the part where the cartridge is set is released and the cover is turned in the direction for opening the part where the cartridge is set. The cartridge holder is also turned in the same direction together with the cover and an optical disc set in the disc rotating mechanism is ejected from this disc rotating mechanism.

The disc recorder/reproducer provided with an ejection mechanism for regulating the ejection of an optical disc set in the disc rotating mechanism as described above controls the operation of the ejection mechanism using the independent drive motor. Therefore, the number of motors constituting the disc recorder/reproducer is increased, the constitution is complicated and the miniaturization of the recorder/reproducer is prevented.

Further, a control circuit for controlling the operation of the drive motor for regulating the operation of the ejection mechanism is required and a control circuit for the entire recorder/reproducer is complicated.

DISCLOSURE OF THE INVENTION

The object of the present invention is to provide a disc ejecting apparatus and a disc cartridge loading apparatus for simplifying the constitution of a recorder and/or reproducer using a disc such as an optical disc on which a signal is recorded as a recording medium.

Another object of the present invention is to provide an ejecting apparatus and a disc loading apparatus for reducing the number of drive motors, simplifying the constitution of the recorder/reproducer and further miniaturizing it.

The other object of the present invention is to provide a disc ejecting apparatus and a disc cartridge loading apparatus for simplifying a control circuit for the recorder/reproducer.

A further object of the present invention is to provide an ejecting apparatus for controlling the ejection of a disc set in a disc precisely rotating mechanism and a disc cartridge loading apparatus.

Furthermore, another object of the present invention is to provide a disc ejecting apparatus and a disc cartridge loading apparatus for enabling the precise recording and/or reproduction of a signal and protecting a disc, a recording and/or reproducing mechanism.

A disc ejecting apparatus according to the present invention comprises a disc rotating mechanism provided with a disc table on which a disc in a disc cartridge is set for rotating the disc housed in the disc cartridge and a motor for rotating this disc table, an ejection mechanism for ejecting the disc cartridge from a location where the disc housed in this disc cartridge is set in the disc rotating mechanism and a switching mechanism for prohibiting the disc cartridge from being ejected by the ejection mechanism when a motor for the disc rotating mechanism is normally rotated and for enabling the ejection of the disc cartridge by the ejection mechanism when this motor is reversely rotated.

A disc cartridge loading apparatus according to the present invention comprises: a disc rotating mechanism provided with a disc table on which a disc in a disc cartridge is set for rotating the disc housed in the disc cartridge and a motor for rotating this disc table; a holder moved between a position in which the disc is set in the disc rotating mechanism and a position in which the disc is separated from the disc rotating mechanism, for holding the disc cartridge; the body wherein the disc rotating mechanism is arranged and the holder is arranged so that the holder can be moved between a position in which the disc is set and a position in which the disc is separated; a cover moved together with the above holder between a first position in which a disc cartridge can be inserted into this holder when the holder is in a position in which the disc is separated and a second position in which the end of the holder into which a disc cartridge is inserted is closed when the holder is in a position in which the disc is set; a holding mechanism for holding this cover in the second position; an operation mechanism for releasing the cover from this holding mechanism and a switching mechanism for prohibiting the release of the cover from the holding mechanism by the operation mechanism when a motor for the disc rotating mechanism is normally rotated and for enabling the release of the cover from the holding mechanism by the operation mechanism.

A disc ejecting apparatus and a disc cartridge loading apparatus according to the present invention control a mechanism for ejecting a disc cartridge using a motor for a disc rotating mechanism.

The further object according to the present invention and profit obtained by the present invention will be clearer from the description of concrete embodiments described below referring to the drawings.

BEST MODE FOR CARRYING OUT THE INVENTION

Figure 1:
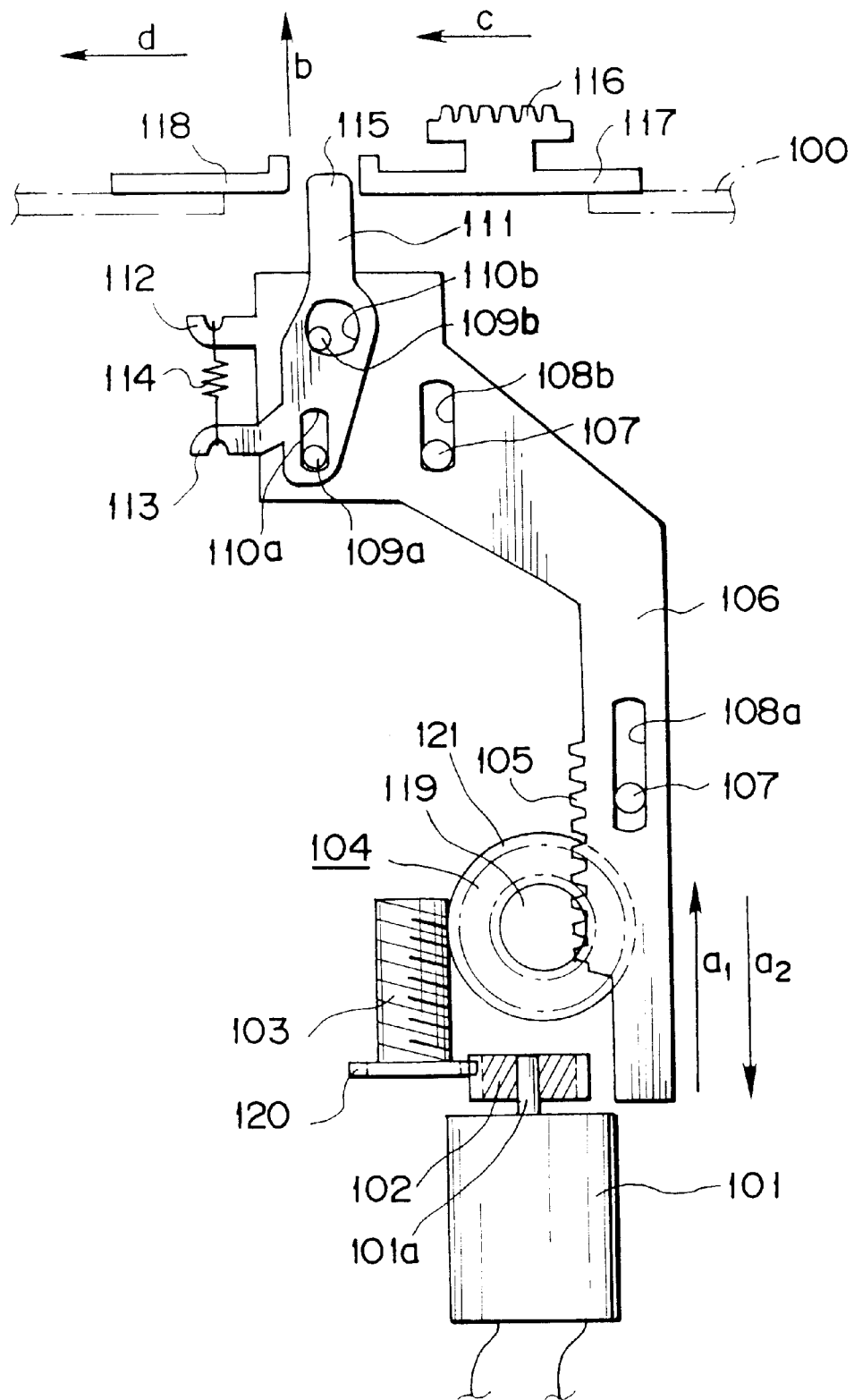
FIG. 1 is a plan showing a disc ejecting apparatus applied to a conventional disc recorder/reproducer.

Embodiments according to the present invention will be described below referring to the drawings.

Examples in which the present invention is applied to a disc recorder/reproducer used for a reproduction only optical disc on which a signal is recorded beforehand and a magneto-optical disc on which a signal can be rerecorded as a recording medium will be described below in the embodiments according to the present invention.

A magneto-optical disc on which a signal can be rerecorded used for this disc recorder/reproducer is formed by forming a layer for recording a signal consisting of a perpendicular magnetic film on a disc substrate. The layer can be approximately 64 mm in diameter and formed by transparent synthetic resin such as polycarbonate resin. A signal is recorded in this layer by heating locally at a higher temperature than the Curie temperature by beams outgoing from the light source of an optical pickup and applying an external magnetic field to the heated portion. A signal recorded on this magneto-optical disc is read by irradiating linearly polarized beams on a layer for recording a signal and detecting, with a photo detector the rotation in the polarized direction by the Kerr effect of return light reflected from the layer for recording a signal.

Referring to a reproduction only optical disc, a signal is recorded beforehand in a pit array consisting of minute irregularities. Reflection coating formed by aluminum or other material is formed on a face on which this pit array is formed. A signal recorded on this optical disc is read by irradiating beams on a pit array and detecting return light reflected via the reflection coating by a photo detector.

Figure 2:
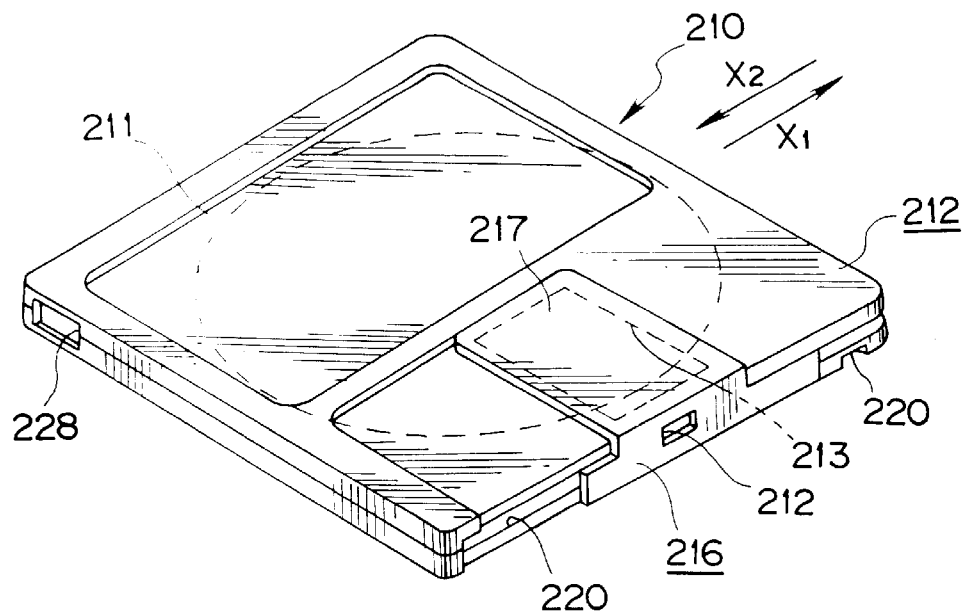
FIG. 2 is a perspective drawing showing a recording/reproduction-type disc cartridge used for a disc recorder/reproducer to which the present invention is applied.
Figure 3:
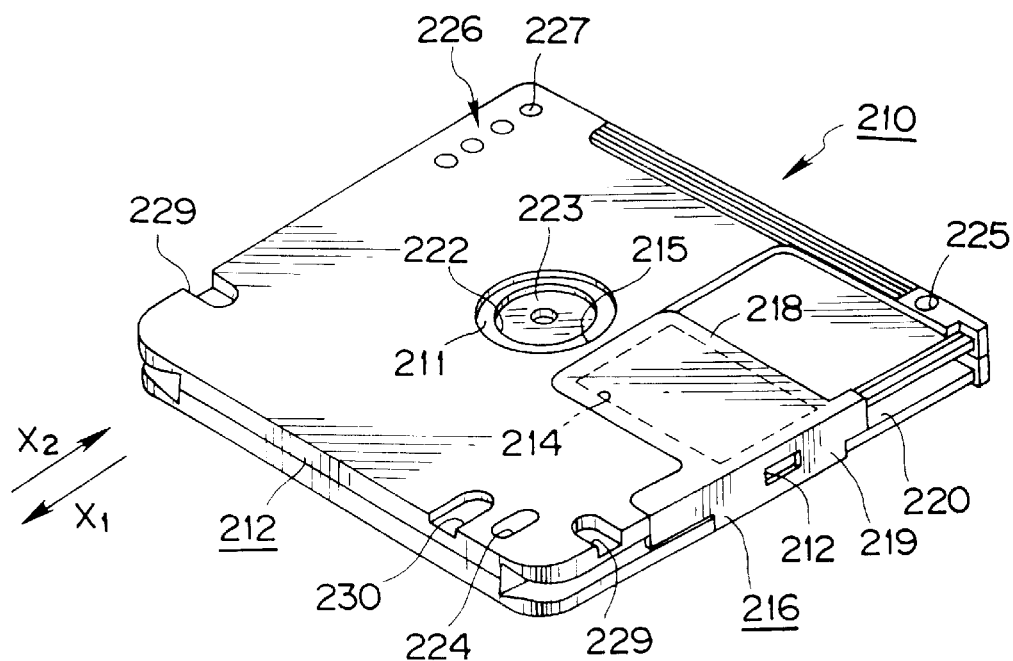
FIG. 3 is a perspective drawing showing the bottom face of the above disc cartridge.

As shown in FIGS. 2 and 3, a disc cartridge 210 housing a magneto-optical disc 211 on which a signal can be rerecorded comprises a square cartridge 212 with the outside diameter of the magneto-optical disc 211 as its approximately inscribed circle. As shown in FIG. 2, an opening 213 for a magnetic head for exposing a part of a signal recorded area of the housed magneto-optical disc 211 is formed on the upper face of this cartridge 211. As shown in FIG. 3, an opening 214 for an optical pickup which is opposite to the opening 213 for a magnetic head and similarly exposes a part of a signal recorded area of the magneto-optical disc 211 is formed on the lower face of the cartridge 212. Further, a central opening 215 through which the disc table of a disc rotating mechanism for rotating the magneto-optical disc 211 enters is formed on the lower face of the cartridge 212.

A shutter member 216 for closing openings 213 and 214 is attached to the cartridge 212. This shutter member 216 is formed by stamping and bending a thin metallic plate or forming synthetic resin and is constituted by shutter plates 217 and 218 large enough to cover the openings 213 and 214 and a coupling 219 for coupling the ends of these shutter plates 217 and 218. The shutter member 216 is formed in the reverse shape of a letter C. Referring to such a constituted shutter member 216, each shutter plate 217 and 218 is attached on the front side of the cartridge 212 to cover each opening 213 and 214 respectively and opens or closes each opening 213 and 214 by being moved along this front side. Referring to the shutter member 216 again, a fitting piece (not shown) is guided along a guide groove 220 by fitting the fitting piece provided to the coupling 219 into the guide groove 220 formed on the front side of the cartridge 212 thereby guaranteeing stable movement.

A fitting portion 221 for fitting a shutter closing operating member provided on the side of a recorder/reproducer for moving the shutter member 216 to a position in which each opening 213 and 214 is open to a position in which each opening is closed when this disc cartridge 210 is ejected from the disc recorder/reproducer is provided in the center of the coupling 219 of the shutter member 216.

In the meantime, a center hole 222 is formed in the center of the magneto-optical disc 211. A hub 223 formed by magnetic metal to close this center hole 222 is attached in the center in which this center hole 222 is formed. This hub 223 is attracted by a magnet arranged on a disc table when the magneto-optical disc 211 is set on the disc table. The center hole 222 and hub 223 are exposed via the central opening 215.

As shown in FIG. 3, a pair of positioning holes 224 and 225 into which a positioning pin provided on the side of the recorder/reproducer is fitted when this disc cartridge 210 is set on the cartridge set part of the disc recorder/reproducer are formed on the lower side of the cartridge 212. As shown in FIG. 3, these positioning holes 224 and 225 are provided on both sides of the front side of the cartridge 212 on which the shutter member 216 is attached. The longer side of one positioning hole 224 is formed in the moving direction of the shutter member 216 and in a position in which the positioning pin fitted into the positioning hole can be adjusted in the range of the longer side. The other positioning hole 225 is formed in the shape of a circle to regulate a position in which the positioning pin is fitted into the positioning hole.

Further, as shown in FIG. 3, a plurality of identification holes 226 are formed on the rear side opposite to the front side on which the positioning holes 224 and 225 are provided on the lower side of the cartridge 212. These identification holes 226 are provided to show the type or the state of a disc housed in the cartridge 212, for indicating whether a signal can be recorded or not. One identification hole 227 provided to the disc cartridge 210 is used for detecting an error record and is opened or closed by an error record preventing member 228 provided in the cartridge 212 so that the member can be moved as shown in FIG. 2. That is, when the error record preventing member 228 is moved, it is switched whether a signal can be recorded on the magneto-optical disc 211 or not and the identification hole 227 shows the result. A fitting concave portion 229 for fitting a part of a leading mechanism for leading the disc cartridge 210 into a recorder and/or reproducer is formed on both sides of the side of the cartridge 212 where the disc cartridge is inserted into the recorder and/or reproducer of the cartridge 212.

Further, a concave portion for identification 230 for identifying a disc housed in the cartridge 212 is also provided on one side of the lower face where the cartridge 212 is inserted into a disc recorder/reproducer.

The disc cartridge 210 constituted as described above is inserted into the disc recorder/reproducer from one side perpendicular to the front side along which the shutter member 216 is moved or ejected from the disc recorder/reproducer. That is, the disc cartridge 210 is inserted into the disc recorder/reproducer in the direction shown by an arrow $X_1$ in FIGS. 2 and 3 or ejected from the disc recorder/reproducer in the direction shown by an arrow $X_2$ in FIGS. 2 and 3.

Figure 4:
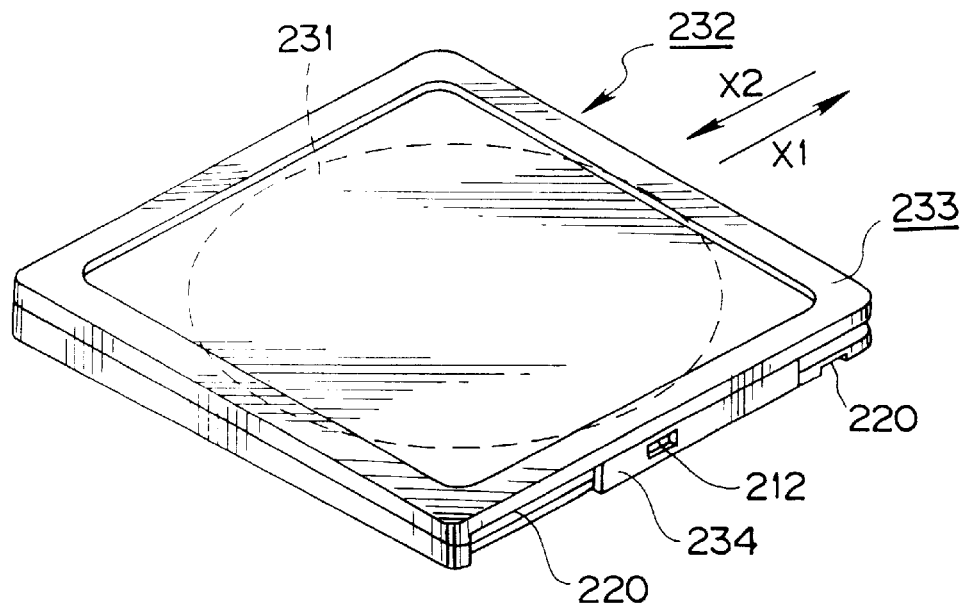
FIG. 4 is a perspective drawing showing a reproduction only disc cartridge used for a disc recorder/reproducer to which the present invention is applied.
Figure 5:
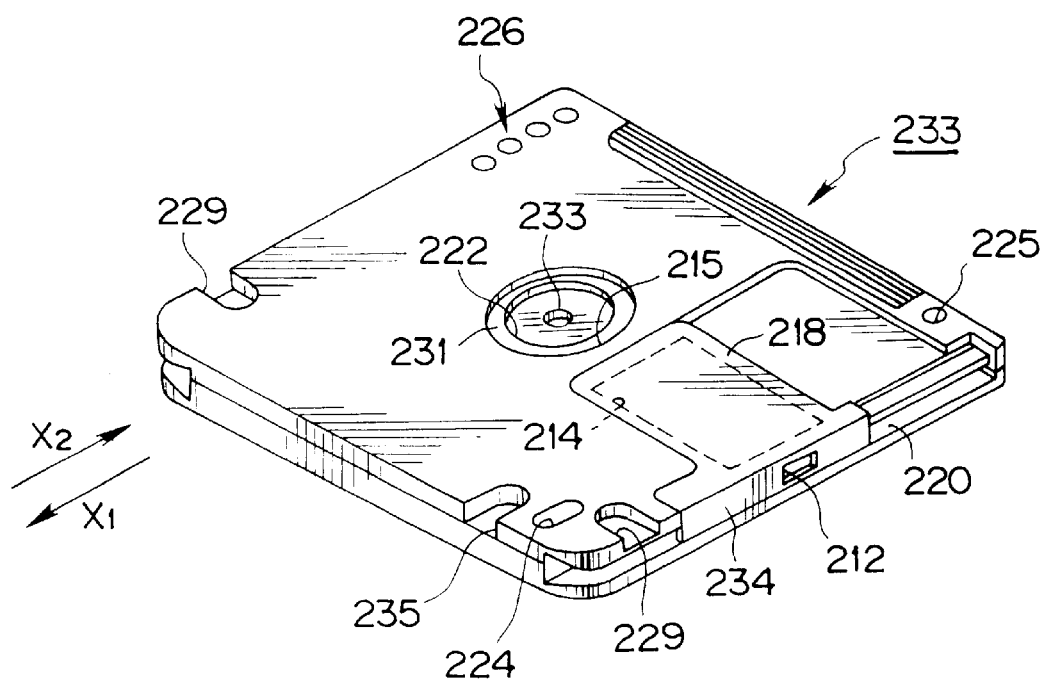
FIG. 5 is a perspective drawing showing the bottom face of the above disc cartridge.

As shown in FIGS. 4 and 5, as a disc cartridge 232 housing a reproduction only optical disc 231 requires no opening for a magnetic head used for recording a signal, the upper side of a cartridge 233 is closed. For a shutter member 234, only a shutter plate 218 for opening or closing an opening 214 for an optical pickup provided on the lower side of a cartridge 233 is provided.

A concave portion for identification 235 for identifying a disc housed in the cartridge 233 is provided in different depth from the concave portion for identification 230 provided to the disc cartridge 210 housing the magneto-optical disc 211. It can be judged whether the disc cartridges 210 and 232 are rewritable or reproduction only by detecting the difference in depth between these concave portions for identification 230 and 235.

As a signal cannot be recorded on the optical disc 231 housed in the reproduction only disc cartridge 232, no error record preventing member is provided to this disc cartridge 232.

As the reproduction only disc cartridge 232 is provided with the same constitution as the rewritable cartridge 210 in the other respects and the same reference number are allocated to the same parts, detailed description will be omitted.

This reproduction only disc cartridge 232 is also inserted into the disc recorder/reproducer from one side perpendicular to the front side along which the shutter member 234 is moved or ejected from the disc recorder/reproducer. That is, the disc cartridge 232 is inserted into the disc recorder/reproducer in the direction shown by an arrow $X_1$ in FIGS. 4 and 5 or ejected from it in the direction shown by the arrow $X_2$ in FIGS. 4 and 5.

Figure 6:
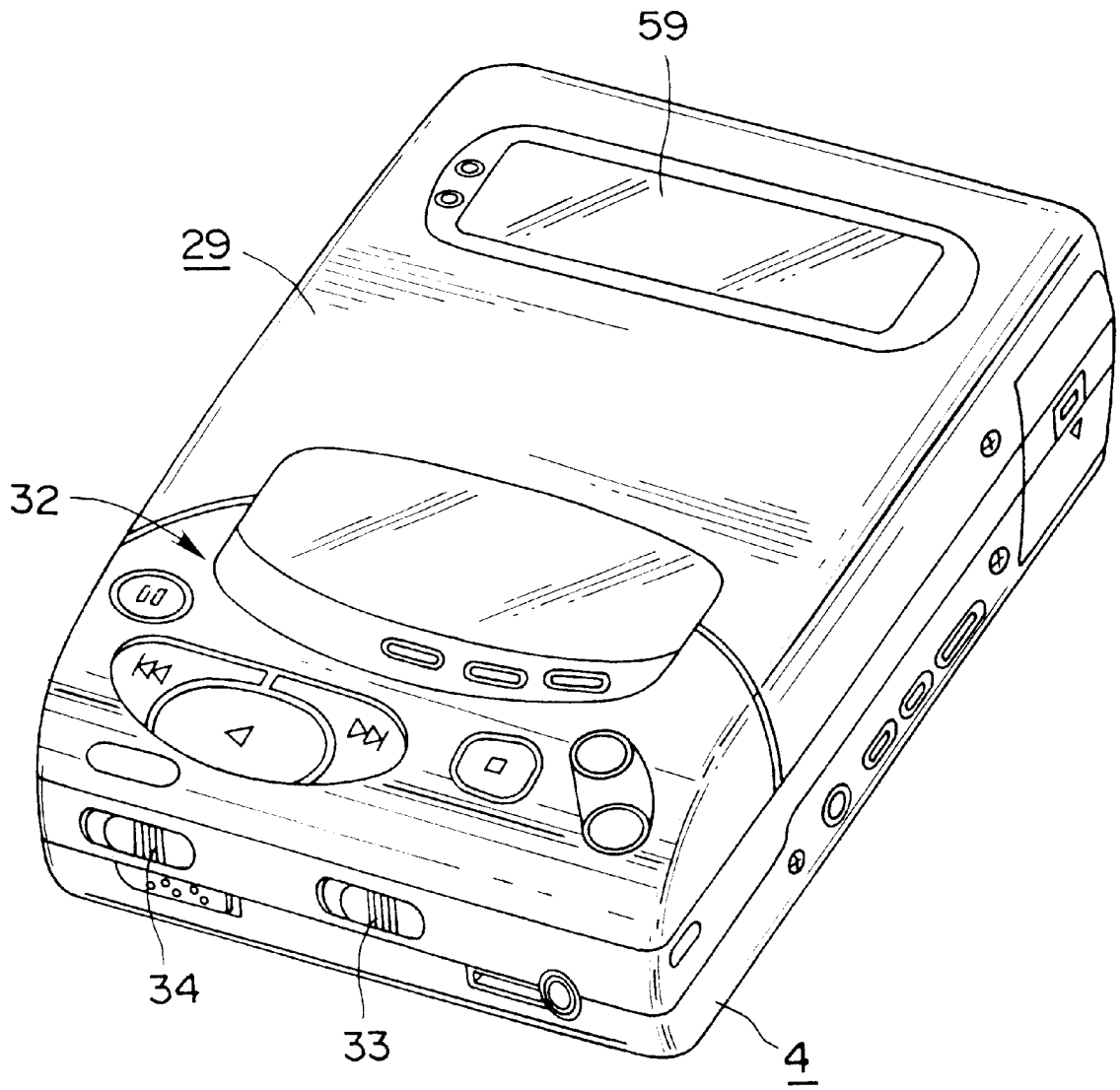
FIG. 6 is a perspective drawing showing the appearance of a disc recorder/reproducer to which the present invention is applied.
Figure 7:
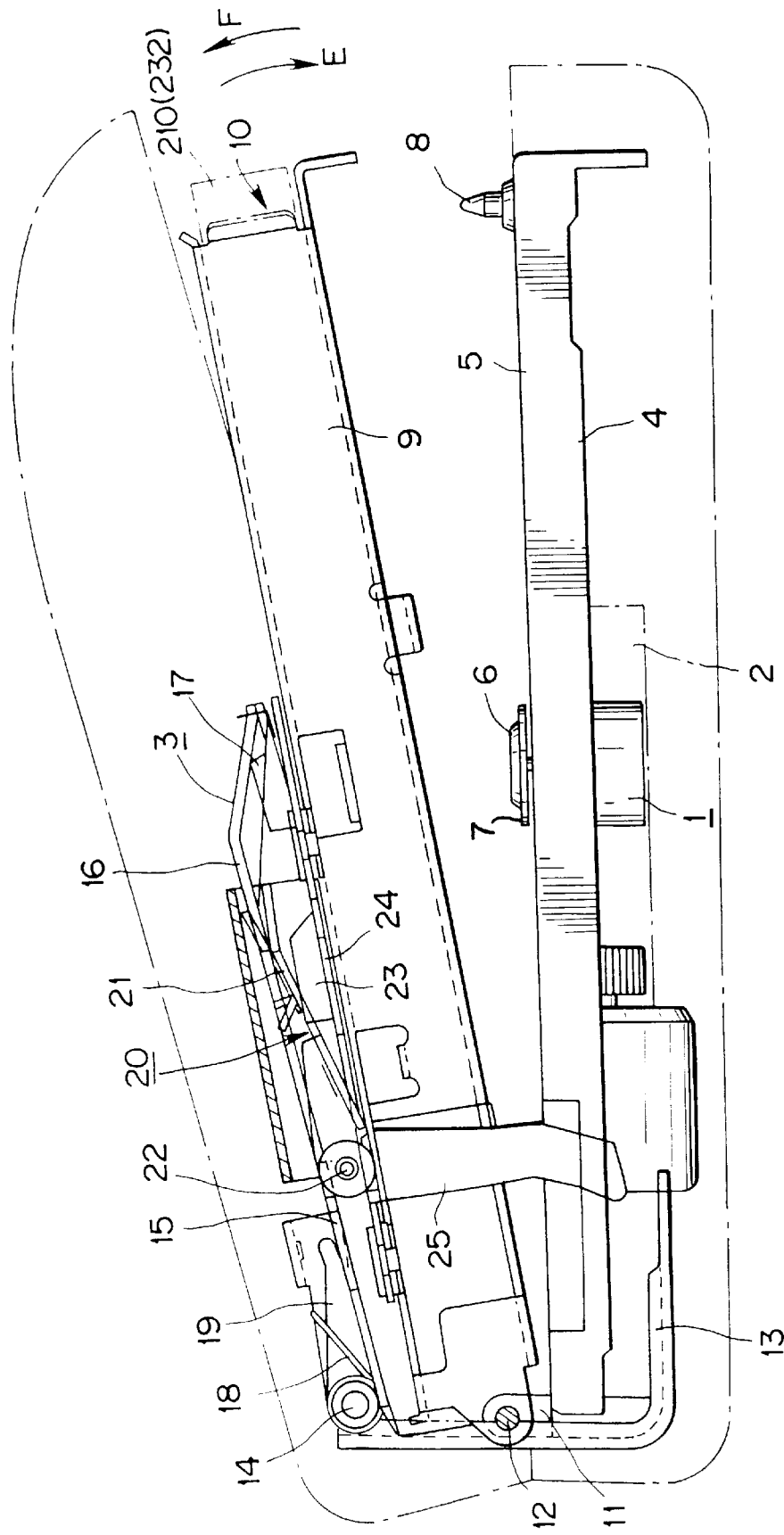
FIG. 7 is a side view of the disc recorder/reproducer showing a state in which a cartridge holder is separated from a part in which a cartridge is set and a disc cartridge is ejected.
Figure 8:
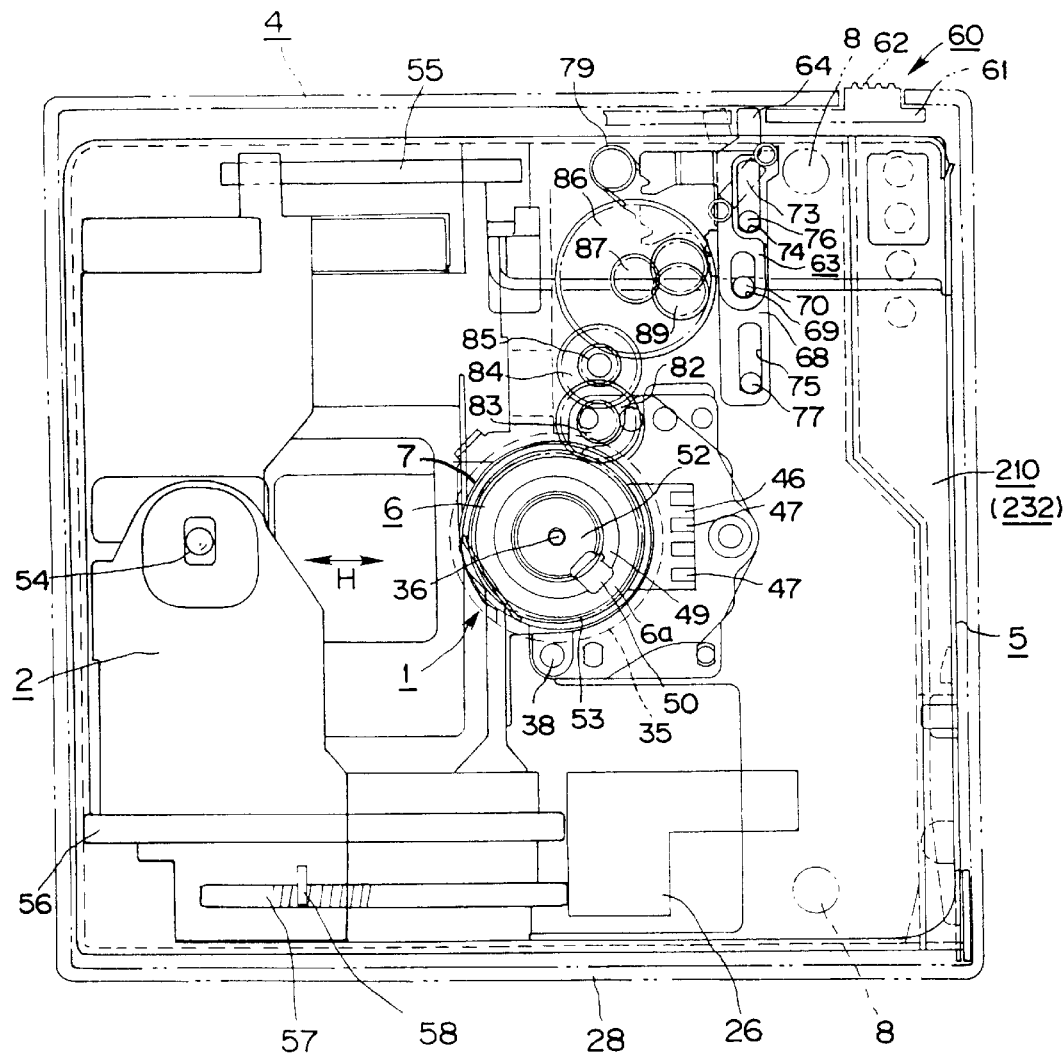
FIG. 8 is a plan showing the recording/reproducing part and the ejecting mechanism of the above disc recorder/reproducer.

As shown in FIGS. 6 and 7, a disc recorder/reproducer to which the present invention is applied using the disc cartridge 210 or 232 constituted as described above as a recording medium comprises a disc rotating mechanism 1 for rotating the magneto-optical disc 211 or the optical disc 231 housed in the disc cartridge 210 or 232, an optical pickup 2 constituting a recording and/or reproducing means for recording and/or reproducing a signal on the magneto-optical disc 211 or the optical disc 231 and the body 4 in which a magnetic head 3 is arranged. The disc rotating mechanism 1 and the optical pickup 2 are attached to a base plate 5 arranged in the body 4. As shown in FIGS. 7 and 8, a cartridge set part 7 in which the disc cartridge 210 or 232 is set is constituted on a disc table 6 of the disc rotating mechanism 1 attached to the base plate 5 and the upper face of the base plate 5 to which an objective lens upon/from which beams are incident of or outgoing from the optical pickup 2 is opposite. As shown in FIGS. 7 and 8, a positioning pin 8 to which positioning holes 224 and 225 provided on the disc cartridge 210 or 232 are fitted is provided to the cartridge set part 7. The disc cartridge 210 or 232 is set in the cartridge set part 7 and positioned by fitting the positioning holes 224 and 225 to the positioning pin 8.

A cartridge holder 9 for holding the disc cartridge 210 or 232 and setting this held disc cartridge 210 or 232 in the cartridge set part 7 is provided to the body 4. Both ends of the front side on which a port 10 for inserting or ejecting the disc cartridge 210 or 232 is provided and the base side opposite to the front side of this cartridge holder 9 are supported by a supporting piece 11 provided on the base plate 5 via a supporting shaft 12 so that the cartridge holder can be turned with this supporting shaft 12 in the center in the directions shown by arrows E and F in FIG. 7 in which the cartridge holder approaches or is separated from the cartridge set part 7.

As shown, the cartridge holder 9 is turned in the direction shown by the arrow E in FIG. 7 with the supporting shaft 12 in the center in a state in which the cartridge holder is separated from the cartridge set part 7 and the disc cartridge 210 or 232 is inserted via the port 10. When the cartridge holder approaches the cartridge set part 7 as shown in FIG. 9, the cartridge holder sets the disc cartridge 210 or 232 in the cartridge set part 7 by positioning and sets the magneto-optical disc 211 or 231 on the disc table 6.

Figure 9:
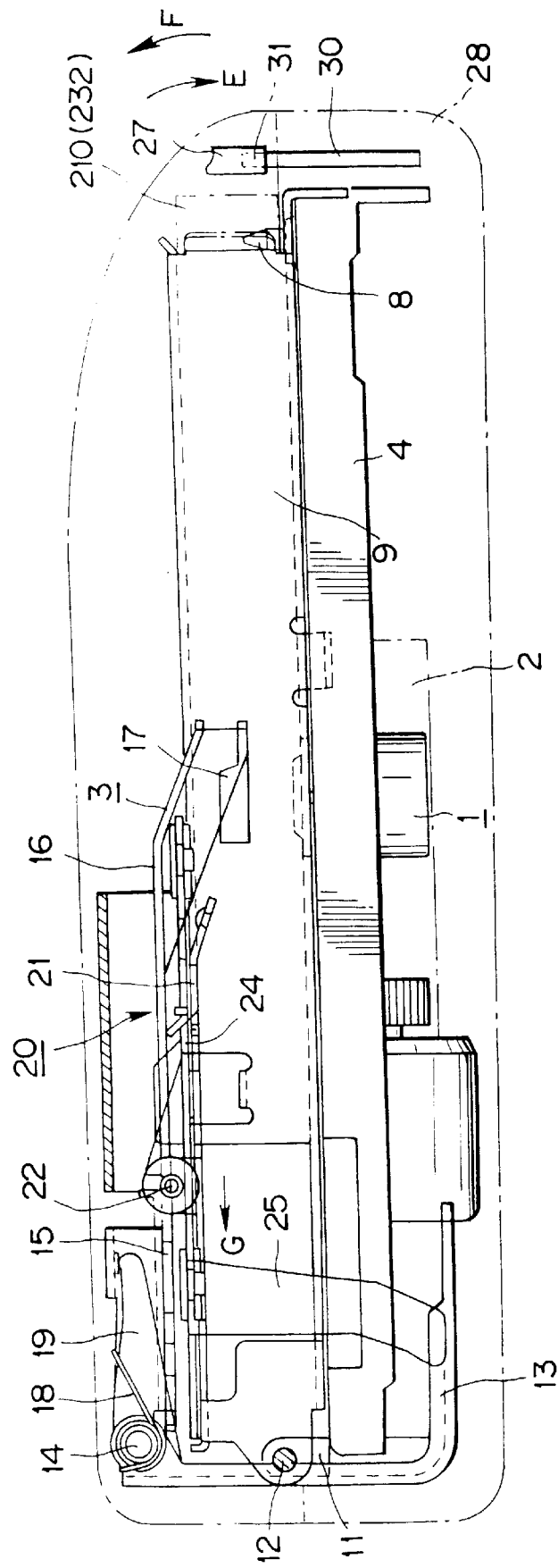
FIG. 9 is a perspective drawing showing a state in which a cover is closed.

When the cartridge holder 9 is turned in the direction shown by the arrow F in FIG. 9 with the supporting shaft 12 in the center from a state in which the disc cartridge 210 or 232 is set in the cartridge set part, it separates the magneto-optical disc 211 or 231 from the disc table 6 and moves the disc cartridge 210 or 232 to a position in which it is ejected.

The magnetic head 3 for recording a signal on the magneto-optical disc 211 together with the optical pickup 2 is arranged on the upper face of the cartridge holder 9. This magnetic head 3 is provided with a magnetic head 17 at the end of a head supporting arm 16 supported by the end of a turning arm 15 attached to the end of a coupling member 13 in the substantially shape of a letter L which is coupled to the optical pickup 2 via a supporting shaft so that the turning arm can be turned. The turning arm 15 is supported by the supporting shaft 14 and is pressed on the side of the cartridge holder 9 by a pressing arm 19 turned and pressed on the side of the turning arm 15 by a twisted coil spring 18. Therefore, the head supporting arm 16 supported by the turning arm 15 is turned in the direction in which the head supporting arm approaches or is separated from the cartridge set part 7 according to the turn of the cartridge holder 9.

A magnetic head control mechanism 20 for controlling the turn of the head supporting arm 16 and for bringing the magnetic head 17 attached to the end of this head supporting arm 16 close to/from the magneto-optical disc 211 or the optical disc 231 in the disc cartridge 221 or 232 set in the cartridge set part 7 is provided on the upper face of the cartridge holder 9. This magnetic head control mechanism 20 comprises a control arm 21 for bringing the head supporting arm 16 close to/from the magneto-optical disc 211 or the optical disc 231 and a turning member 23 for turning this control arm 21 with a supporting shaft 22 in the center. This turning member 23 is attached to a sliding plate 24 moved on the upper face of the cartridge holder 9. This sliding plate 24 is extended on the side of the body 4 so that its operating arm 25 is hung on the side of the base end. When it is detected that the disc cartridge 210 housing the magneto-optical disc 211 is set in the cartridge set part 7, the sliding plate 24 is moved in the direction shown by an arrow G in FIG. 9 via the operating arm 25. When the sliding plate 24 is moved in the direction shown by the arrow G in FIG. 9, the turning member 23 is separated from the control arm 21. The control arm 21 is turned toward the side of the cartridge holder 9 and the head supporting arm 16 is also turned in the same direction to touch the magnetic head 17 to the magneto-optical disc 211 on the disc table 6.

As the magnetic head 3 is coupled to the optical pickup 2 via the coupling member 13, it is moved to the radial direction of the magneto-optical disc 211 or the optical disc 231 set on the disc table 6 in synchronization with the movement of the optical pickup 2. That is, the magnetic head 3 is moved in the radial direction of the magneto-optical disc 211 or the optical disc 231 set on the disc table 6 integrally with the optical pickup 2 by the driving of a pickup feeding motor 26 (see FIG. 8).

As shown in FIGS. 7 and 9, the body 4 to the base plate 5 of which the disc rotating mechanism 1 and the optical pickup 2 are attached is housed in an outside housing 28. A cover 29 (see FIG. 6) turned in synchronization with the cartridge holder 9 for closing the cartridge set part 7 is provided to this outside housing 28. The base end of this cover 29 is attached to the outside housing 28 via a supporting shaft. The cover 29 is coupled so that it can be turned in synchronization with the cartridge holder 9 when it is turned with the supporting shaft in the center. That is, the cover 29 and the cartridge holder 9 are coupled via a coupling mechanism.

As shown in FIG. 7, when the cartridge holder 9 is separated from the cartridge set part 7, the cover 29 is turned to a first position in which the port 10 into/from which the disc cartridge 210 or 232 is inserted or ejected on the front side of the cartridge holder 9 is open. When the cartridge holder 9 is turned to a position shown in FIG. 9 in which the disc cartridge 210 or 232 is set in the cartridge set part 7, the cover 29 is turned to a second position in which the port 10 of the cartridge holder 9 is closed. At this time, a fitted portion 27 of the cover 29 is fitted to a locking piece 31 provided on a second ejection lever 30 constituting an ejection mechanism described later which is provided on the side of the body 4 and the cover is held in the second position.

As shown in FIG. 6, when the cover 29 is located in the second position, it is matched with the outside housing 28 and closes the cartridge set part 7 together with the cartridge holder 9.

As shown in FIG. 6, the cover 29 is provided with a button 32 for selecting the operation mode of the disc recorder/reproducer out of a plurality of operation modes and a display 59 for displaying the selected operation mode and the state of operation.

As shown in FIG. 6, a recording mode selecting button 33 for selecting a recording mode and an ejection lever operating button 34 for moving the first ejection lever of the ejection mechanism are provided on the front side of the outside housing 28 housing the body 4. When cover 29 held in the second position by the locking piece 31 is released by operating the ejection lever operating button 34 after recording or reproducing a signal on the magneto-optical disc 211 or the optical disc 231 in the disc cartridge 210 or 232 set in the cartridge set part 7 is completed, the cover 29 and the cartridge holder 9 are turned in the direction shown by the arrow F in FIG. 9. That is, the cartridge holder 9 is turned in a position in which it is separated from the cartridge set part 7 as shown in FIG. 7 and the cover 29 is turned in the first position in which the port 10 of the cartridge holder 9 is open, and the magneto-optical disc 211 or the optical disc 232 set on the disc table 6 is ejected.

Next, the further detailed constitution of the disc rotating mechanism 1 arranged in the body 4 will be described.

Figure 10:
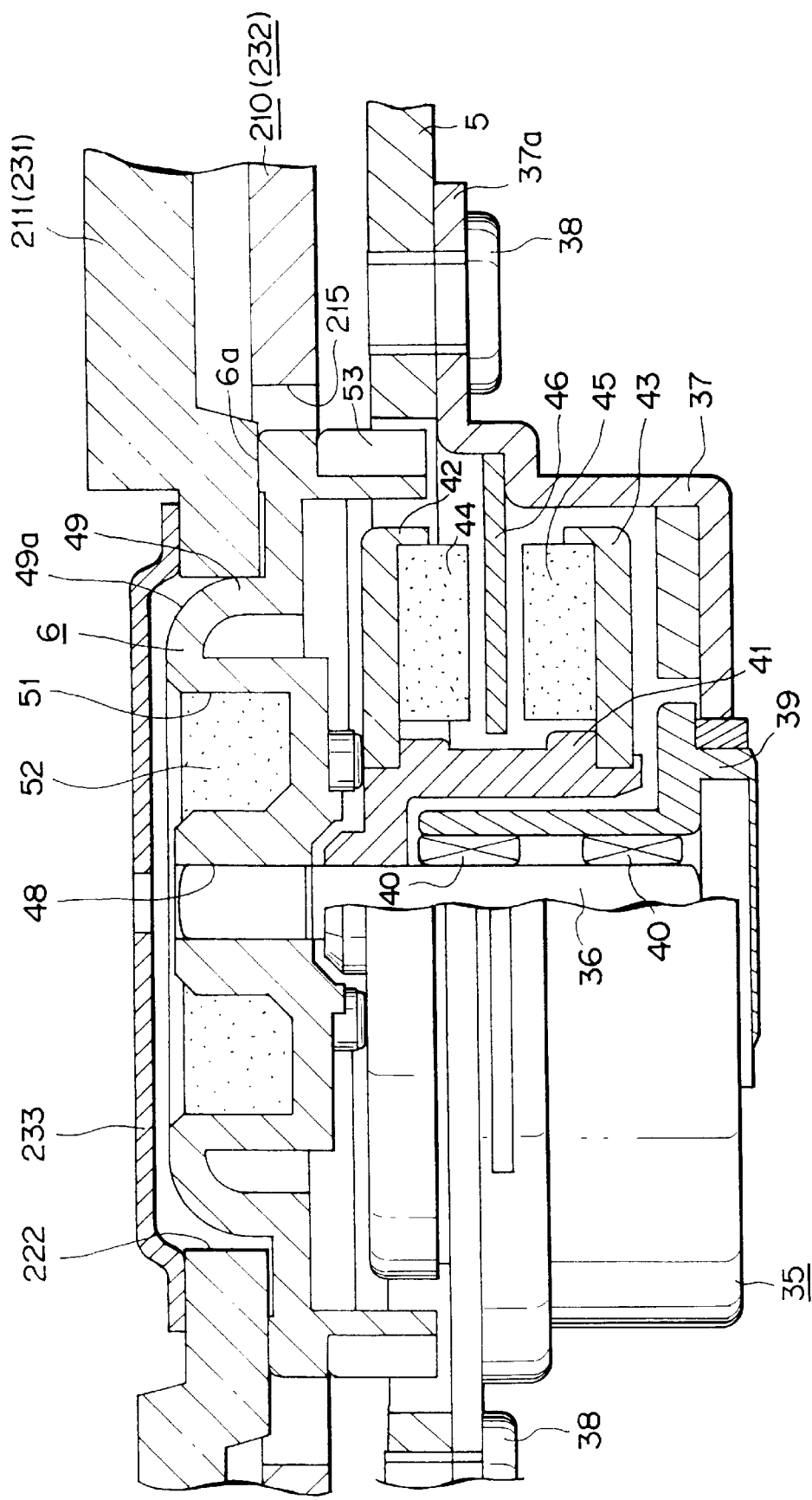
FIG. 10 is a sectional view of a disc rotating mechanism showing a state in which a disc is set on a disc table.

As shown in FIG. 10, the disc rotating mechanism 1 is provided with the disc table 6 on which the magneto-optical disc 211 or the optical disc 232 in the disc cartridge 210 or 232 set in the cartridge set part 7 is set and a spindle motor 35 for rotating this disc table 6. The spindle motor 35 is attached on the lower face of the base plate 5 with its driving shaft 36 protruded from the upper face of the base plate 5 on which the cartridge set part 7 is arranged. The spindle motor 35 is attached on the base plate 5 by fixing the flange 37a of a motor housing 37 on the base plate 5 with a fixing screw 38.

The driving shaft 36 of the spindle motor 35 is supported by a shaft supporting member 39 arranged in the housing 37 via a pair of bearings 40, 40 so that the driving shaft can be rotated. A yoke attaching member 41 is integrated with the driving shaft 36 and rotor magnets 44 and 45 are attached via a pair of yokes 42 and 43 attached opposite to this yoke attaching member 41. The rotor magnets 44 and 45 are formed in the shape of a ring and magnetized in their circumferential direction. A printed circuit board 46 provided with a stator coil is arranged between the pair of rotor magnets 44 and 45. This printed circuit board 46 is fixed in the housing 37 and a part is protruded from the housing 37. As shown in FIG. 8, a connecting terminal 47 to which a feeder for feeding the stator coil is connected is provided in the part of the printed circuit board 46 protruded from the housing 37.

When driving current is supplied to the stator coil via the feeder connected to the connecting terminal 47, the driving shaft 36 of the spindle motor 35 is rotated normally or reversely according to the direction of the flow of driving current supplied to the stator coil.

The disc table 6 is formed in the shape of a disc and attached so that the disc table is rotated integrally with the driving shaft 36 as shown in FIG. 10 via a fitting hole 48 provided in the center thereof to the end of the driving shaft 36. A positioning projection 49 for positioning this magneto-optical disc 211 or the optical disc 231 on the disc table 6 by fitting a center hole 222 of the magneto-optical disc 211 or the optical disc 231 set on this disc table 6 to the center of the disc table 6 is provided. A fitting guide 49a formed so that the diameter thereof is reduced toward the end is formed at the end of this positioning projection 49. The fitting guide 49a guides so that the center hole 222 of the magneto-optical disc 211 or the optical disc 231 is smoothly fitted to the positioning projection 49.

Figure 11:
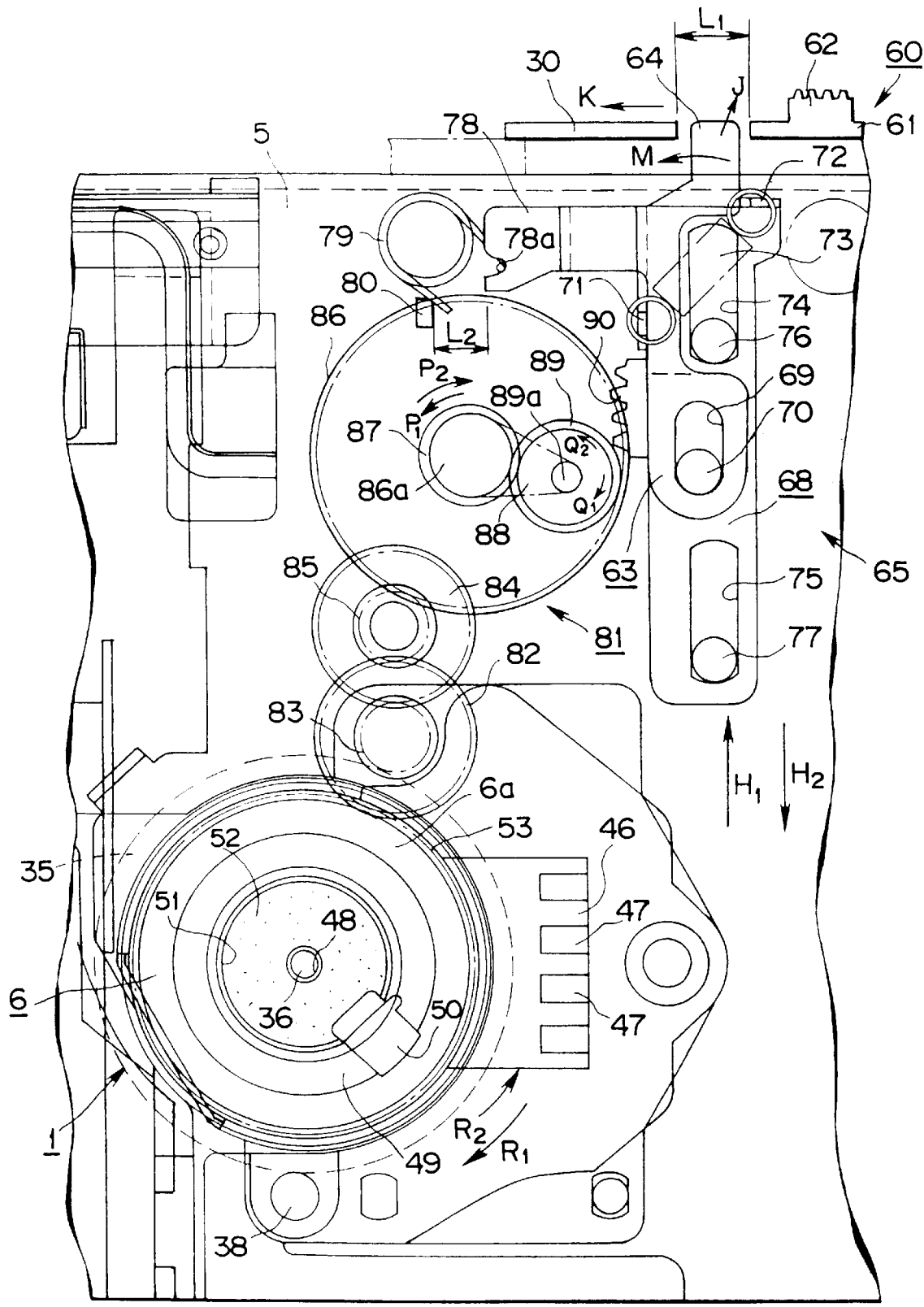
FIG. 11 is a plan of a disc ejecting apparatus showing a state in which operation for ejecting a disc cartridge is enabled.

As shown in FIGS. 8 and 11, a disc presser 50 protruded toward the periphery thereof is provided to the positioning projection 49. This disc presser 50 is formed in the direction in which it is located on the positioning projection 49 so that it can be elastically displaced. When the center hole 222 of the magneto-optical disc 211 or the optical disc 231 is fitted to the positioning projection 49 and set on the disc table 6, the magneto-optical disc 211 or the optical disc 231 is positioned to be set on the disc table 6 because the disc presser 50 presses and supports the inside face of the center hole 222.

A concave portion 51 is formed on the end face of the positioning projection 49 and a magnet 52 for attracting a disc is arranged in this concave portion 51. This magnet 52 attracts a hub 233 so that the magneto-optical disc 211 or the optical disc 231 is pressed and supported on the disc loaded face 6a of the disc table 6 and holds it so that it can be rotated integrally with the disc table 6.

As shown in FIG. 10, the disc table 6 enters the disc cartridge 210 or 232 set in the cartridge set part 7 via a central opening 215 to load the magneto-optical disc 211 or the optical disc 231.

A gear 53 is provided to the periphery on the bottom of the disc table 6.

The optical pickup 2 is attached via the base plate 5 to which the disc rotating mechanism 1 is attached. The optical pickup 2 is provided with a semiconductor laser which is a light source for irradiating beams for scanning the signal recorded area of the magneto-optical disc 211 or the optical disc 231 loaded onto the disc table 6, an objective lens to which return light reflected from the magneto-optical disc 211 or the optical disc 231 is incident for focusing beams outgoing from the semiconductor laser and irradiating them upon the magneto-optical disc 211 or the optical disc 231, an optical instrument such as a beam splitter for separating beams outgoing from the semiconductor laser and return light, and an optical detector for detecting return light.

The objective lens of the optical pickup 2 is directed toward the cartridge set part 7. As shown is FIG. 8 the optical pickup is supported by a pair of guide shafts 55 and 56 attached on the lower face of the base plate 5 in parallel, is guided by these guide shafts 55 and 56 and is moved in the radial direction of the magneto-optical disc 211 or the optical disc 231 loaded onto the disc table 6. The optical pickup 2 is fed by a feed screw 57 rotated by the pickup feeding motor 26. The optical pickup 2 is coupled to this feed screw 57 by fitting a fitting pin 58 provided at one end thereof to the feed screw 57. The optical pickup 2 is moved in the radial direction shown by an arrow H in FIG. 8 of the magneto-optical disc 211 or the optical disc 231 loaded onto the disc table 6 by the driven pickup feeding motor 26 and the rotated feed screw 57. When the optical pickup 2 is fed, the magnetic head 3 coupled to this optical pickup 2 via the coupling member 13 as described above is also moved in the radial direction of the magneto-optical disc 211 or the optical disc 231.

An ejection mechanism 60 for unlocking the cover 29 held in the second position in which the port 10 of the cartridge holder 9 turned in a position in which the disc cartridge 210 or 232 is set in the cartridge set part 7 is closed, turning the cover 29 and the cartridge holder 9 and ejecting the disc cartridge 210 or 232 from the cartridge set part 7 is provided to the disc recorder/reproducer. A mechanism for regulating the ejection of the disc cartridge 210 or 232 according to the state of the operation of the disc recorder/reproducer is provided to this ejection mechanism 60. This mechanism is operated by the driving force of the spindle motor 35 of the disc rotating mechanism 1.

As shown in FIGS. 8 and 11, the ejection mechanism 60 is provided with first and second ejection levers 61 and 30 moved along one side of the base plate 5 constituting the body 4. A mover 62 for moving this lever 61 is provided to the first ejection lever 61. This mover 62 is opposite a through hole 62a provided to the outside housing 28 and the operating button 34 is attached to the end of the mover 62. This first ejection lever 61 is moved in the direction shown by an arrow K in FIG. 11 by moving the operating button 34.

The first and second ejection levers 61 and 30 are arranged with them separated by a fixed distance $L_1$ between opposite ends. That is, as the first ejection lever 61 comes in contact with the second ejection lever 30 when the first ejection lever 61 is moved, the second ejection lever 30 is separated from the first ejection lever by a distance $L_1$ across which the second ejection lever cannot be directly moved. A transmission lever 63 advancing or retreating between these first and second ejection levers 61 and 30 for transmitting the operating physical force of the first ejection lever 61 to the second ejection lever 30 is arranged between the first and second ejection levers 61 and 30, which are separated from each other by a fixed distance $L_1$. Therefore, when the first ejection lever 61 is moved in the direction shown by the arrow K in FIG. 11, the turned part 64 of the transmission lever 63 located between the first and second ejection levers 61 and 30 is pressed by the end of the first ejection lever 61 and the transmission lever 63 is turned in the direction shown by an arrow M in FIG. 11. When the transmission lever 63 is turned in the direction shown by the arrow M in FIG. 11, the turned part 64 presses the second ejection lever 30 and moves it in the direction shown by the arrow K in FIG. 11.

When the second ejection lever 30 is moved, the fitting of the locking piece 30 provided to this lever 30 and the fitted portion 27 provided to the cover 29 is released and the cover 29 held in the second position is turned in the direction shown by the arrow F in FIG. 9. The cover 29 is turned in the direction shown by the arrow F in FIG. 9 via a turning means not shown. When the cover 29 is turned, the cartridge holder 9 is also turned in the same direction together with this cover 29, the disc cartridge 210 or 232 held in this cartridge holder 9 is ejected from the cartridge set part 7 and the magneto-optical disc 211 or the optical disc 232 loaded onto the disc table 6 is ejected.

In the meantime, the transmission lever 63 constitutes an ejection regulating mechanism 65 for regulating the ejection of the disc cartridge 210 or 232 according to the state of the operation of the disc recorder/reproducer, is arranged so that the transmission lever 63 can be swung on an ejection regulating lever 68 arranged on the base plate 5 so that the ejection regulating lever can be moved and is located between the first and second ejection levers 61 and 30 with the turned part 64 at the end protruded from one side of the base plate 5. This transmission lever 63 is arranged on the ejection regulating lever 68 with its supporting hole 69 fitted to a supporting shaft 70 planted on the ejection regulating lever 68. The transmission lever 63 is moved in the direction shown by an arrow J in FIG. 11 protruding the turned part 64 between the first and second ejection levers 61 and 30 by a tension spring 73 stretched between a spring fitting piece 71 formed on one side thereof and a spring fitting piece 72 provided to the ejection regulating lever 68.

As the transmission lever 63 is supported by the supporting shaft 70 via the supporting hole 69 with a longer diameter in the moved direction, it can be moved in the direction shown by the arrow J in FIG. 11 against pressure by the tension spring 73 in the range of the length of the supporting hole 69. Therefore, even if the transmission lever 63 is pressed against pressure by the tension spring 73, it is moved independent of the ejection regulating lever 68, thereby regulating the unnecessary movement of the ejection regulating lever 68 and holding the ejection regulating lever 68 securely in a fixed position.

The ejection regulating lever 68 on which the transmission lever 63 is arranged is supported in the directions shown by arrows $H_1$ and $H_2$ in FIG. 11 in which the transmission lever 63 advances or retreats between the first and second ejection levers 61 and 30. The ejection regulating lever can be moved by fitting first and second supporting holes 74 and 75 with a longer diameter in the moved direction of the transmission lever 63 to first and second supporting shafts 76 and 77 planted on the base plate 5. A spring fitting piece 78 is protruded in the direction substantially perpendicular to the moved direction of this ejection regulating lever 68 on one side of the end of the ejection regulating lever 68. A spring fitting concave portion 78a is provided at the end of this spring fitting piece 78 and one arm 79a (see FIG. 13) of a toggle spring 79 arranged on the base plate 5 is fitted into the spring fitting concave portion. That is, the toggle spring 79 is arranged in a state in which the toggle spring is elastically pressed between the ejection regulating lever 68 and the spring fitting piece 80 of the base plate 5 utilizing pressure in the direction in which first and second arms 79a and 79b are separated.

The ejection regulating lever 68 and the spring fitting piece 80 are arranged so that an interval $L_2$ between the end face of the spring fitting piece 78 of the ejection regulating lever 68 and the spring fitting piece 80 provided on the base plate 5 is the shortest when the ejection regulating lever 68 is located substantially in the center between a position in which the turned part 64 of the transmission lever 63 is protruded between the first and second ejection levers 61 and 30 and a position in which the turned part 64 is withdrawn from between the first and second ejection levers 61 and 30 to regulate the ejection of the disc cartridge 210 or 232. Therefore, when the ejection regulating lever 68 is moved in a position in which the turned part 64 of the transmission lever 63 is protruded between the first and second ejection levers 61 and 30 to enable the ejection of the disc cartridge 210 or 232 or in a position in which the turned part 64 is withdrawn from between the first and second ejection levers 61 and 30 to prevent the ejection of the disc cartridge 210 or 232, the interval $L_2$ between the end face of the spring fitting piece 78 of the ejection regulating lever 68 and the spring fitting piece 80 provided on the base plate 5 is longer than when the transmission lever 63 is in an intermediate position.

Figure 13:
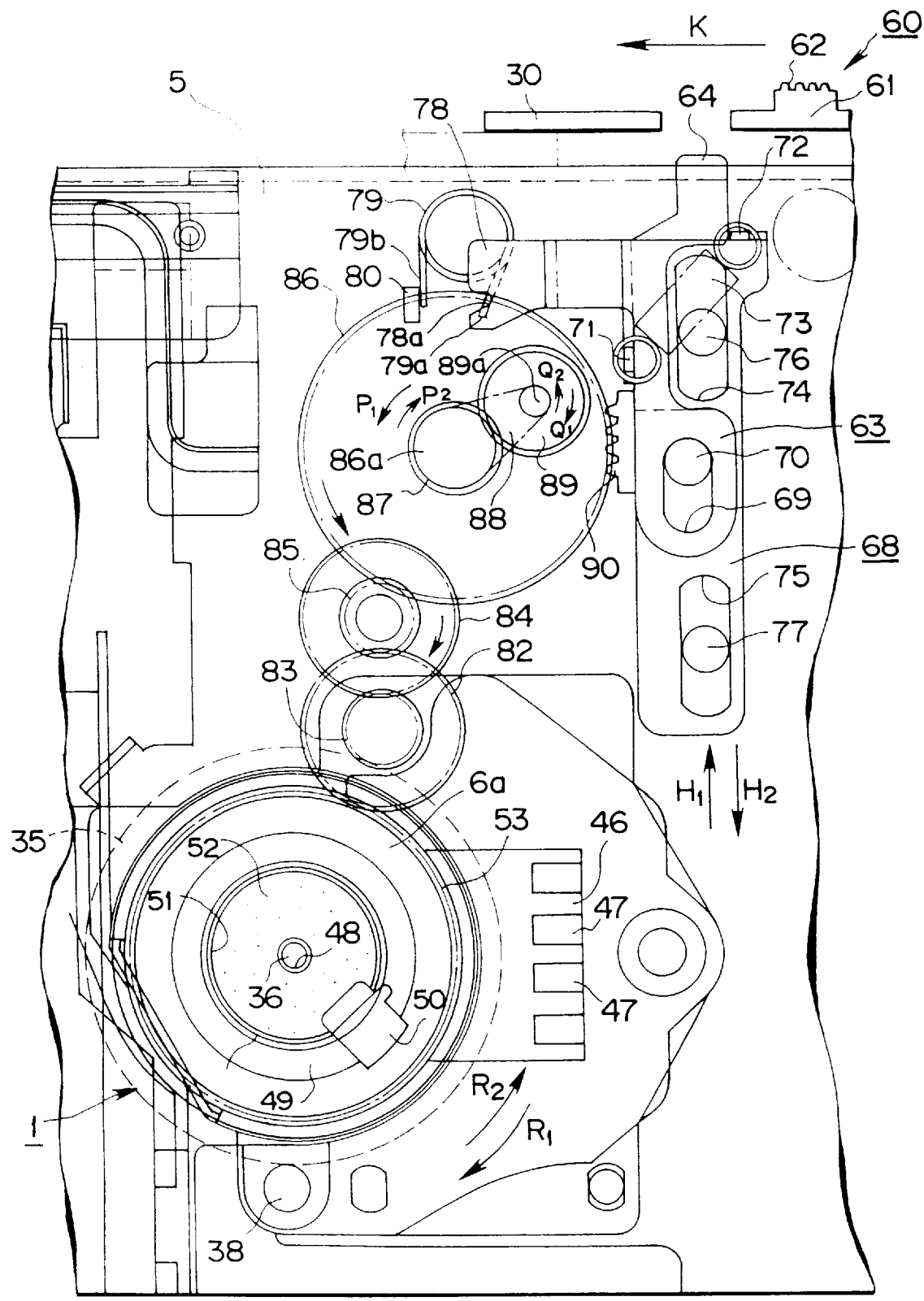
FIG. 13 is a plan of the disc ejecting apparatus showing a state in which operation for ejecting a disc cartridge is regulated.

As shown, when the ejection regulating lever 68 is moved from the intermediate position to a position for enabling ejection, the toggle spring 79 moves and presses this ejection regulating lever 68 in the direction shown by the arrow $H_1$ in FIG. 11 and as shown in FIG. 13, when the ejection regulating lever 68 is moved from the intermediate position to a position for regulating ejection, the toggle spring moves and presses this ejection regulating lever 68 in the direction shown by the arrow $H_2$.

The ejection regulating lever 68 is moved by the spindle motor 35 of the disc rotating mechanism 1. The driving force of the spindle motor 35 is transmitted via a driving force transmitting mechanism 81 constituted by a plurality of gears. This driving force transmitting mechanism 81 is attached on the base plate 5 so that it can be rotated and is provided with a first transmission gear 82 engaged with the gear 53 provided on the periphery of the disc table 6, a second transmission gear 83 provided on the same axis as the first transmission gear 82 with a shorter diameter than the first transmission gear 82, a third transmission gear 84 engaged with this second transmission gear 83 and attached on the base plate 5 so that the third gear can be rotated, a fourth transmission gear 85 provided on the same axis as this third transmission gear 84 with a shorter diameter than the third transmission gear 84, a fifth transmission gear 86 engaged with this fourth transmission gear 85 and attached on the base plate 5 so that the fifth transmission gear can be rotated and a sixth transmission gear 87 provided on the same axis as this fifth transmission gear 86 with a shorter diameter than the fifth transmission gear 86.

An oscillating lever 88 is attached to the rotation axis 86a of the fifth transmission gear 86 via a friction member not shown. An oscillating gear 89 engaged with the sixth transmission gear 87 via a supporting shaft 89a is attached to the end of this oscillating lever 88 so that the oscillating gear can be rotated. The driving force of the fifth transmission gear 86 is transmitted to the oscillating lever 88 to which this oscillating gear 89 is attached via the friction member and the oscillating lever 88 is rotated in the same direction as this fifth transmission gear 86. The oscillating gear 89 is engaged with the sixth transmission gear 87 and is engaged with a rack gear 90 formed halfway on one side of the ejection regulating lever 68.

Figure 12:
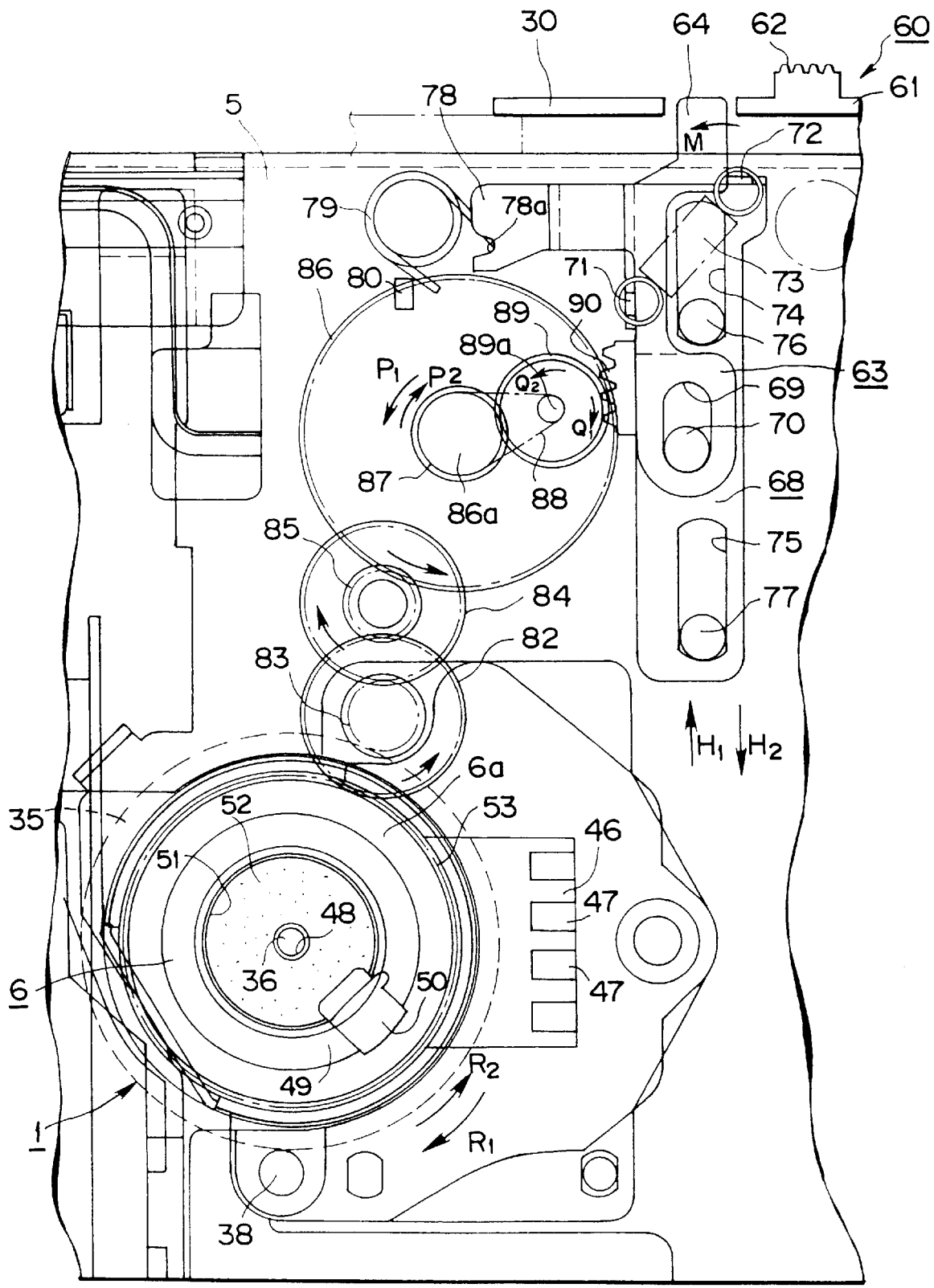
FIG. 12 is a plan of the disc ejecting apparatus showing a state in which an ejection regulating lever is operated.

When the magneto-optical disc 211 or 231 is loaded onto the disc table 6 and recording and/or reproducing a signal on this magneto-optical disc 211 or 231 is started, the spindle motor 35 of the disc rotating mechanism 1 is normally rotated in the direction shown by an arrow $R_1$ in FIG. 12. When the spindle motor 35 is rotated in the direction shown by the arrow $R_1$ in FIG. 12, the fifth transmission gear 86 coupled to the gear 53 of the disc table 6 via the first, second, third and fourth transmission gears 82, 83, 84 and 85 respectively and the sixth transmission gear 87 provided on the same axis as this fifth transmission gear 86 are rotated in the direction shown by an arrow $P_1$ in FIG. 12 reverse to the rotational direction of the spindle motor 35. When the sixth transmission gear 87 is rotated in the direction shown by the arrow $P_1$ in FIG. 12, the oscillating lever 88 is rotated in the same direction shown by the arrow $P_1$ in FIG. 12 and the oscillating gear 89 supported at the end is engaged with the rack gear 90 of the ejection regulating lever 68. At this time, the oscillating gear 89 engaged with the sixth transmission gear 87 is rotated in the direction shown by an arrow $Q_1$ in FIG. 12 and the ejection regulating lever 68 is moved in the direction shown by the arrow $H_2$ in FIG. 12. When the ejection regulating lever 68 is moved in the direction shown by the arrow $H_2$ in FIG. 12, the transmission lever 63 is also moved in the same direction and as shown in FIG. 13, the turned part 64 is withdrawn from between the first and second ejection levers 61 and 30. When the ejection regulating lever 68 moves the turned part 64 to a position in which the turned part is withdrawn from between the first and second ejection levers 61 and 30, the oscillating gear 89 and the rack gear 90 are disengaged as shown in FIG. 13. At this time, as the spindle motor is being rotated normally in the direction shown by the arrow $R_1$ in FIG. 13, torque in the direction shown by the arrow $P_1$ in FIG. 13 is being applied to the oscillating lever 88 and the engagement of the oscillating gear 89 with the rack gear 90 is regulated. As a load on the oscillating gear 89 is released when the oscillating gear 89 is separated from the rack gear 90, torque transmitted to the oscillating lever 88 supported by the rotation axis 86a of the fifth transmission gear 86 via the friction member is reduced and the oscillating lever 88 is held in a position in which the oscillating gear 89 is separated from the rack gear 90.

When the ejection regulating lever 68 is moved to a position in which the turned part 64 is withdrawn from between the first and second ejection levers 61 and 30, it is pressed and moved in the direction shown by the arrow $H_2$ in FIG. 13 by pressure from the toggle spring 79 and is prohibited from moving in the direction shown by the arrow $H_1$ in FIG. 13. That is, a state in which the turned part 64 is withdrawn from between the first and second ejection levers 61 and 30 is kept.

When the turned part 64 is withdrawn from between the first and second ejection levers 61 and 30, the second ejection lever 30 is not moved even if the first ejection lever 61 is operated. That is, as a distance in which the first ejection lever 61 is moved is that in which the first ejection lever does not press the second ejection lever 30 directly, the second ejection lever 30 is not moved as long as the turned part 64 is not protruded between them. As the second ejection lever 30 is not operated, the ejection of the disc cartridge 210 or 232 set in the cartridge set part 7 is prohibited and the magneto-optical disc 211 or the optical disc 231 are held on the disc table 6.

When recording a signal on the magneto-optical disc 211 loaded onto the disc table 6 is finished and recording the catalog of recorded signals on the magneto-optical disc 211 is completed or the reproduction of a desired signal recorded on the magneto-optical disc 211 or the optical disc 231 loaded onto the disc table 6 is completed, the spindle motor 35 is stopped and the recording and/or the reproduction of a signal by the disc recorder/reproducer ceases. When the recording and/or the reproduction of a signal is completed, a control signal for controlling the driving of the spindle motor 35 is output from a control circuit for controlling the operation of, for example the disc recorder/reproducer and the spindle motor 35 starts to rotate in the direction shown by an arrow $R_2$ in FIG. 13, that is, reversely according to this control signal.

A control signal for controlling the driving of the spindle motor 35 is output in fixed time after the recording and/or the reproduction of a signal is naturally finished or after recording and/or reproduction is forcedly finished.

When the spindle motor 35 is rotated in the direction shown by the arrow $R_2$ in FIG. 13, the fifth transmission gear 86 coupled to the gear 53 of the disc table 6 via the first, second, third and fourth transmission gears 82, 83, 84 and 85 respectively and the sixth transmission gear 87 provided on the same axis as this fifth transmission gear 86 are rotated in the direction shown by an arrow $P_2$ in FIG. 13 reverse to the rotational direction of the spindle motor 35. When the sixth transmission gear 87 is rotated in the direction shown by the arrow $P_2$ in FIG. 13, the oscillating lever 88 is rotated in the same direction shown by the arrow $P_2$ in FIG. 12 and the oscillating gear 89 supported at the end of the oscillating lever is engaged with the rack gear 90 of the ejection regulating lever 68. At this time, the oscillating gear 89 engaged with the sixth transmission gear 87 is rotated in the direction shown by an arrow $Q_2$ in FIG. 12 and moves the ejection regulating lever 68 in the direction shown by the arrow $H_1$ in FIG. 12. When the ejection regulating lever 68 is moved in the direction shown by the arrow $H_1$ in FIG. 12, the transmission lever 63 is also moved in the same direction and as shown in FIG. 12, the turned part 64 is protruded between the first and second ejection levers 61 and 30. When the ejection regulating lever 68 is moved to a position in which the turned part 64 is protruded between the first and second ejection levers 61 and 30, the oscillating gear 89 and the rack gear 90 disengage as shown in FIG. 11. At this time, as the spindle motor is being rotated in the reverse direction shown by an arrow $R_2$ in FIG. 13, force for rotating the oscillating lever 88 in the direction shown by the arrow $P_2$ in FIG. 11 is being applied to the oscillating lever 88 and the engagement of the oscillating gear 89 with the rack gear 90 is regulated. As a load upon the oscillating gear 89 is released when the oscillating gear 89 is separated from the rack gear 90, torque transmitted to the oscillating lever 88 supported by the rotation axis 86a of the fifth transmission gear 86 via the friction member is reduced and the oscillating lever 88 is held in a position in which the oscillating gear 89 is separated from the rack gear 90.

When the ejection regulating lever 68 is moved to a position in which the turned part 64 is protruded between the first and second ejection levers 61 and 30, the ejection regulating lever is pressed and moved in the direction shown by the arrow $H_1$ in FIG. 11 by pressure from the toggle spring 79 resulting in a state in which the movement to the direction shown by the arrow $H_2$ is prevented. That is, the ejection regulating lever is held in a state in which the turned part 64 is protruded between the first and second ejection levers 61 and 30.

When the first ejection lever 61 is moved in the direction shown by the arrow K in FIG. 11, the second ejection lever 30 is moved in the direction shown by the arrow K via the turned part 64 of the transmission lever 63, the lock of the cover 29 is released, the disc cartridge 210 or 232 held in the cartridge holder 9 is ejected from the cartridge set part 7 and the magneto-optical disc 211 or the optical disc 232 loaded onto the disc table 6 is ejected.

In the meantime, in this embodiment, the range in which the ejection regulating lever 68 is moved between an ejection enabling position in which the turned part 64 of the transmission lever 63 is protruded between the first and second ejection levers 61 and 30 and an ejection preventing position in which the turned part 64 is withdrawn from between the first and second ejection levers 61 and 30 is set to 2 mm respectively in the directions shown by the arrows $H_1$ and $H_2$ in FIG. 11 based upon a neutral position which is an intermediate position between the ejection enabling position and the ejection preventing position. If this overall range in which the ejection regulating lever 68 is moved is X (mm), that is, respectively $(X/2)$ (mm) in the directions shown by the arrows $H_1$ and $H_2$ with the neutral position as a reference, the length of the rack gear 90 is L (mm) and a distance in which the oscillating gear 89 is moved by the rotation of the oscillating lever 88 is P (mm), the values are set so that the relationship as follows is maintained:

$P > (L-X) \geq 0$.

Next, another embodiment of the disc recorder/reproducer to which the present invention is applied will be described.

In this embodiment, a driving force transmitting mechanism for transmitting the driving force of a spindle motor 35 to an ejection regulating lever is simplified and the number of used springs is reduced.

In this embodiment, only the constitution of a main part is shown, common reference numbers are allocated to members common to the above embodiment and the detailed description is omitted.

Figure 14:
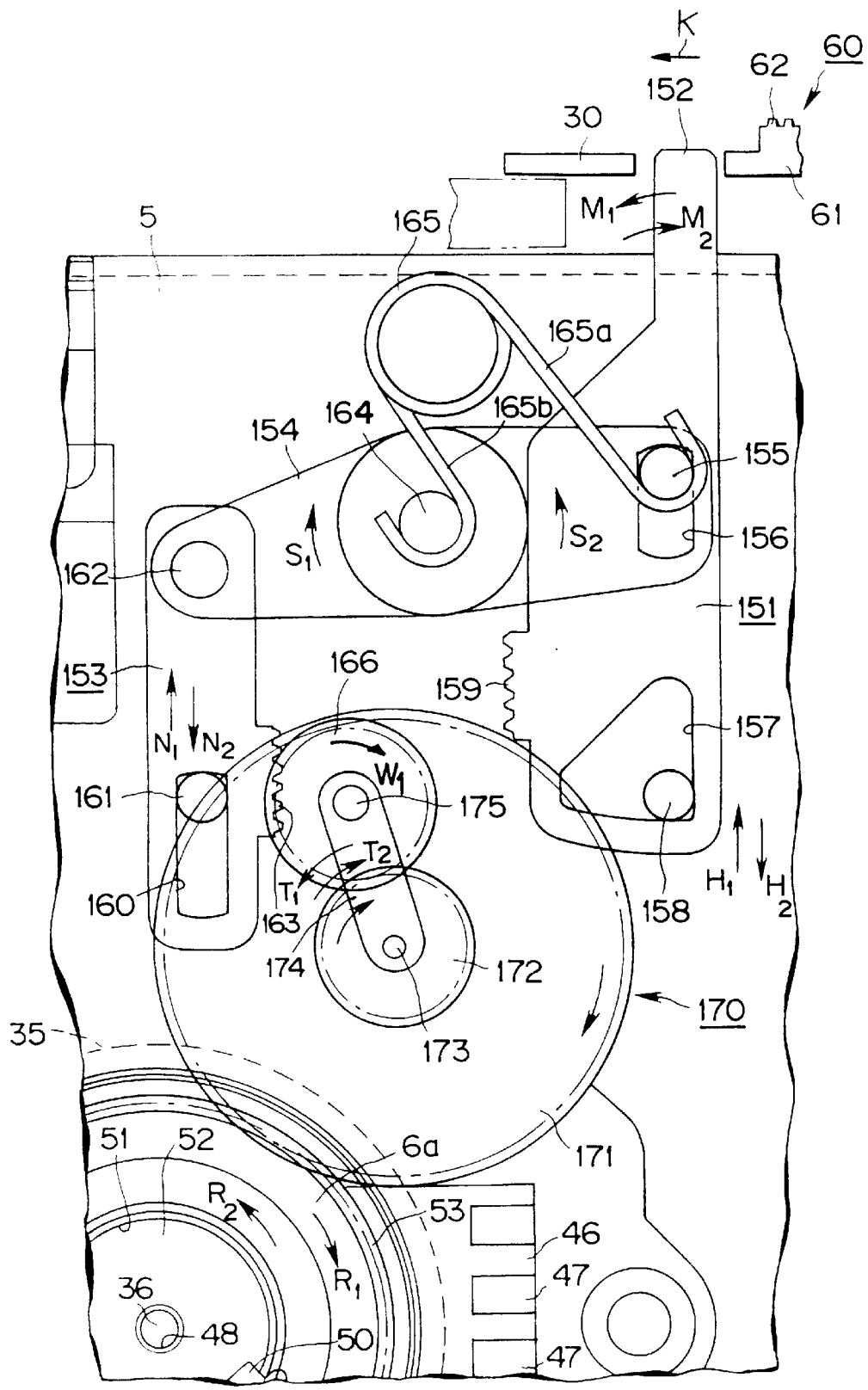
FIG. 14 shows another embodiment according to the present invention and is a plan of a disc ejecting apparatus showing a state in which operation for ejecting a disc cartridge is enabled.

Referring to a disc recorder/reproducer according to this embodiment, as shown in FIG. 14, an ejection regulating lever 151 advancing or retreating between first and second ejection levers 61 and 30 is arranged on a base plate 5. In this embodiment, a turned part 152 at the end of the ejection regulating lever 151 is directly advanced or withdrawn between the first and second ejection levers 61 and 30.

Therefore, in this embodiment, the ejection regulating lever 151 constitutes a transmission mechanism for transmitting the operation of the first ejection lever 61 to the second ejection lever 30.

A moving lever 153 which is another lever substantially parallel to the ejection regulating lever 151 is arranged on the base plate 5. The ejection regulating lever 151 and the moving lever 153 are coupled by a coupling lever 154 constituting a link mechanism.

The ejection regulating lever 151 is coupled to the coupling lever 154 by fitting a first coupling shaft 155 planted halfway into a coupling hole 156 provided at one end of the coupling lever 154 as a long hole and is arranged on the base plate 5 by fitting a first guide shaft 158 planted on the base plate 5 into a substantially triangular turning guide hole 157 provided at the base end of the ejection regulating lever. This ejection regulating lever 151 can be moved in the direction shown by the arrows $H_1$ and $H_2$ in FIG. 14 in which the turned part 152 at the end is advanced or withdrawn between the first and second ejection levers 61 and 30. The first coupling shaft 155 thereof is guided along the coupling hole 156 and by the first guide shaft 158 planted on the base plate 5 and is supported on the base plate 5 so that the ejection regulating lever can be turned in the directions shown by arrows $M_1$ and $M_2$ in FIG. 14 with the first coupling shaft 155 in the center. A first rack gear 159 engaged with an oscillating gear described later is provided on one side of the base end of this ejection regulating lever 151.

One end of the moving lever 153 is coupled to the other end of the coupling lever 154 via a second coupling shaft 162 so that the moving lever can be turned by fitting a guide hole 160 with a longer diameter in the moved direction thereof to a second guide shaft 161 planted on the base plate 5. This moving lever 153 is moved in the directions shown by arrows $N_1$ and $N_2$ in FIG. 14, the guide hole 160 thereof being guided by the second guide shaft 161. A second rack gear 163 which is another rack gear engaged with the oscillating gear described later is provided halfway down one side of the moving lever 153.

The coupling lever 154 for coupling the ejection regulating lever 151 and the moving lever 153 is supported by a supporting shaft 164 planted on the base plate 5 substantially in the center thereof so that the coupling lever can be turned in the directions shown by arrows $S_1$ and $S_2$ in FIG. 14 with this supporting shaft 164 in the center.

A toggle spring 165 is hooked between the supporting shaft 164 for supporting the coupling lever 154 and the coupling shaft 155 planted on the ejection regulating lever 151. One arm 165a of this toggle spring 165 is fitted to the coupling shaft 155 and the other arm 165b is fitted to the supporting shaft 164. When the ejection regulating lever 151 is moved in the direction shown by the arrow $H_1$ in FIG. 14 in which the turned part 152 is protruded between the first and second ejection levers 61 and 30, the toggle spring 165 exceeds a neutral point and presses the ejection regulating lever 151 in the direction shown by the arrow $H_2$ in FIG. 14. When the ejection regulating lever 151 is moved in the direction shown by the arrow $H_2$ in FIG. 14 in which the turned part 152 is withdrawn from between the first and second ejection levers 61 and 30, the toggle spring 165 exceeds the neutral point and presses the ejection regulating lever 151 in the direction shown by the arrow $H_1$ in FIG. 14.

A driving force transmitting mechanism 170 for selectively engaging the oscillating gear 166 with the first rack gear 159 provided to the ejection regulating lever 151 or the second rack gear 163 provided to the moving lever 153 and for selectively transmitting the driving force of the spindle motor 35 to the ejection regulating lever 151 or the moving lever 153 is provided on the base plate 5. This driving force transmitting mechanism 170 is provided with a first transmission gear 171 engaged with the gear 53 provided on the periphery of the disc table 6 and a second transmission gear 172 provided on the same axis as this first transmission gear 171 with a shorter diameter than the first transmission gear 171. An oscillating lever 174 is attached to a supporting shaft 173 of the first and second transmission gears 171 and 172 via a friction member not shown. An oscillating gear 166 is attached to the end of this oscillating lever 174 via a supporting shaft 175 so that the oscillating gear can be rotated. This oscillating gear 166 is normally engaged with the second transmission gear 172. The driving force of the second transmission gear 172 is transmitted to the oscillating lever 174 to which the oscillating gear 166 is attached via the friction member and the oscillating lever is turned in the directions shown by arrows $T_1$ and $T_2$ in FIG. 14 according to the rotational direction of this second transmission gear 172.

Figure 15:
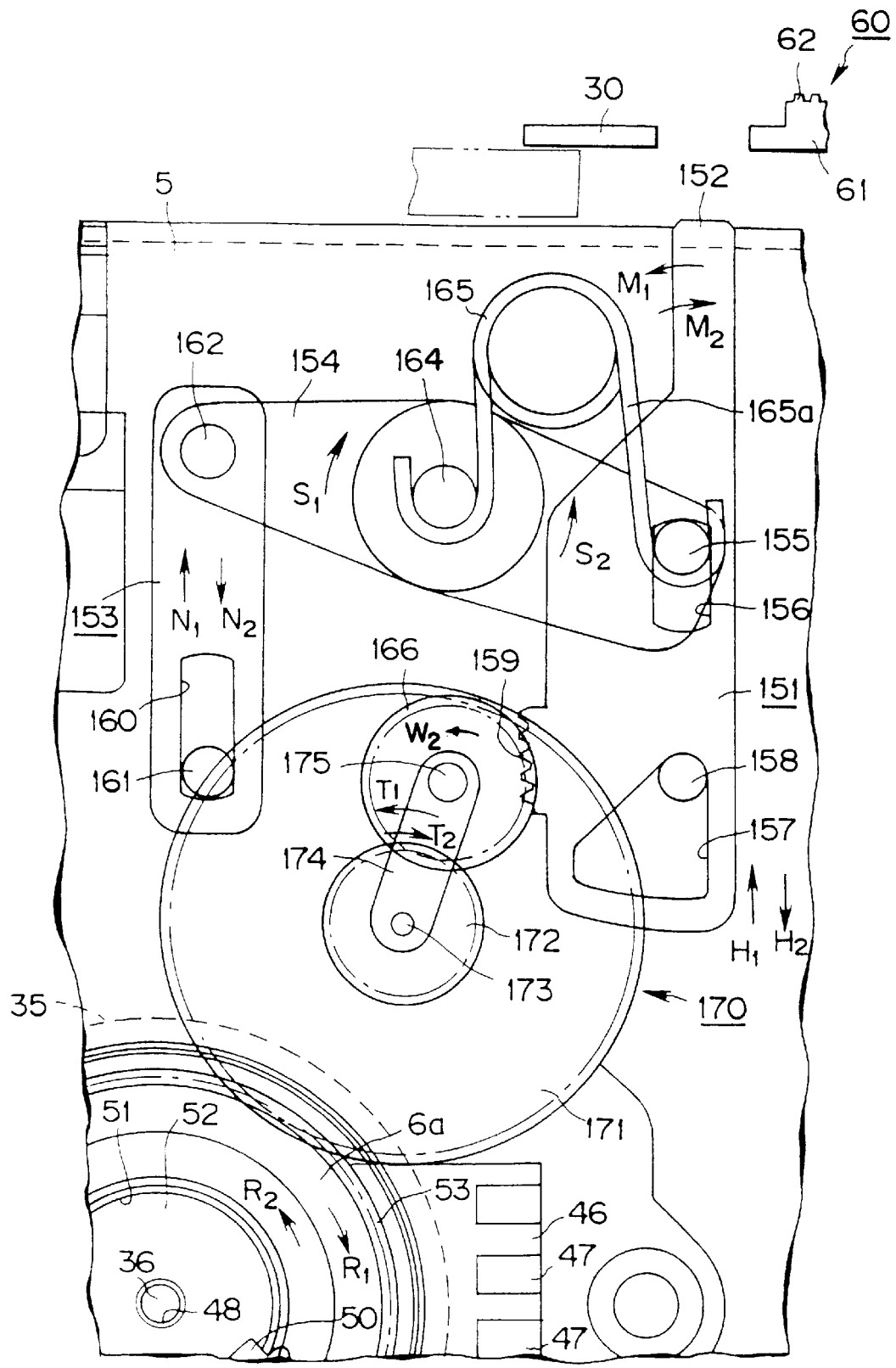
FIG. 15 is a plan of the disc ejecting apparatus according to the above embodiment showing a state in which operation for ejecting a disc cartridge is regulated.

When the magneto-optical disc 211 or 231 is loaded onto the disc table 6 and recording and/or reproducing a signal on this magneto-optical disc 211 or 231 is started, the spindle motor 35 of the disc rotating mechanism 1 is normally rotated in the direction shown by the arrow $R_1$ in FIG. 14. When the spindle motor 35 is rotated in the direction shown by the arrow $R_1$ in FIG. 14, the first and second transmission gears 171 and 172 are rotated in the direction shown by the arrow $T_1$ in FIG. 14, the oscillating lever 174 is turned in the direction shown by the arrow $T_1$ in FIG. 14 and the oscillating gear 166 attached at the end of the oscillating lever 174 is engaged with the second rack gear 163 of the moving lever 153. At this time, the oscillating gear 166 also engaged with the second transmission gear 172 is rotated in the same direction shown by an arrow $W_1$ in FIG. 14 as the rotational direction of the spindle motor 35 and moves the moving lever 153 in the direction shown by the arrow $N_1$ in FIG. 14. The coupling lever 154 with supporting shaft 164 in the center is turned in the direction shown by the arrow $S_1$ in FIG. 14 by the movement of this moving lever 153 in the direction shown by the arrow $N_1$ in FIG. 14 and moves the ejection regulating lever 151 in the direction shown by the arrow $H_2$ in FIG. 14. The turned part 152 is withdrawn from between the first and second ejection levers 61 and 30 as shown in FIG. 15 by moving the ejection regulating lever 151 in the direction shown by the arrow $H_2$ in FIG. 14. When the ejection regulating lever 151 is moved to a position in which the turned part 152 is withdrawn from between the first and second ejection levers 61 and 30, engagement between the oscillating gear 166 and the second rack gear 163 is released. At this time, as the spindle motor 35 is being rotated normally in the direction shown by the arrow $R_1$ in FIG. 15, torque in the direction shown by the arrow $T_1$ in FIG. 15 is being applied to the oscillating lever 174 and the engagement of the oscillating gear 166 with the second rack gear 163 is sustained. As a load upon the oscillating gear 166 is released when the oscillating gear 166 is separated from the second rack gear 163, torque transmitted to the oscillating lever 174 supported by the supporting shaft 173 of the first and second transmission gears 171 and 172 via the friction member is reduced and the oscillating lever 174 is held in a position in which the oscillating gear 166 is separated from the second rack gear 163.

When the ejection regulating lever 151 is moved to a position in which the turned part 152 is withdrawn from between the first and second ejection levers 61 and 30, it is pressed and moved in the direction shown by the arrow $H_2$ in FIG. 15 by pressure from the toggle spring 165 and held in a state in which the movement thereof in the direction shown by the arrow $H_1$ in FIG. 15 is prevented. That is, a state in which the turned part 152 is withdrawn from between the first and second ejection levers 61 and 30 is held.

When the turned part 152 is withdrawn from between the first and second ejection levers 61 and 30, the second ejection lever 30 is not moved even if the first ejection lever 61 is operated. That is, as the second ejection lever 30 is located such that is not directly pressed when the first ejection lever 61 is moved, the second ejection lever 30 is not moved as long as the turned part 152 is not protruded between them. As the second ejection lever 30 is not operated, the ejection of the disc cartridge 210 or 232 set in the cartridge set part 7 and taking off the magneto-optical disc 211 or the optical disc 231 loaded onto the disc table 6 is prevented.

When recording a signal on the magneto-optical disc 211 loaded onto the disc table 6 is finished and recording the catalog of recorded signals on the magneto-optical disc 211 is completed or the reproduction of a desired signal recorded on the magneto-optical disc 211 or the optical disc 231 loaded onto the disc table 6 is completed, the spindle motor 35 is stopped and the recording and/or the reproduction of a signal by the disc recorder/reproducer is completed. When the recording and/or the reproduction of a signal is completed, a control signal for controlling the driving of the spindle motor 35 is output from a control circuit for controlling the operation of, for example the disc recorder/reproducer and the spindle motor 35 starts to rotate in the direction shown by the arrow $R_2$ in FIG. 15, that is, reversely according to this control signal.

When the spindle motor 35 is rotated in the direction shown by the arrow $R_2$ in FIG. 15, the first and second transmission gears 171 and 172 are rotated in the direction shown by the arrow $T_2$ in FIG. 15, the oscillating lever 174 is turned in the direction shown by the arrow $T_2$ and the oscillating gear 166 attached to the end of the oscillating lever 174 is engaged with the first rack gear 159 of the ejection regulating lever 151. At this time, the oscillating gear 166 also engaged with the second transmission gear 172 is rotated in the same direction as the rotational direction of the spindle motor 35 shown by an arrow $W_2$ in FIG. 15 and moves the ejection regulating lever 151 in the direction shown by the arrow $H_1$ in FIG. 15. The coupling lever 154 with the supporting shaft 164 in the center is turned in the direction shown by the arrow $S_2$ in FIG. 15 by the movement of this ejection regulating lever 151 in the direction shown by the arrow $H_1$ in FIG. 15 and moves the ejection regulating lever 153 in the direction shown by the arrow $N_2$ in FIG. 15. As shown in FIG. 14, the turned part 152 is protruded between the first and second ejection levers 61 and 30 by the movement of the ejection regulating lever 151 in the direction shown by the arrow $H_1$ in FIG. 15. When the ejection regulating lever 151 is moved to a position in which the turned part 152 is protruded between the first and second ejection levers 61 and 30, engagement between the oscillating gear 166 and the first rack gear 159 is released.

At this time, as the spindle motor 35 is being rotated reversely in the direction shown by the arrow $R_2$ in FIG. 15, torque in the direction shown by the arrow $T_2$ in FIG. 15 is being applied to the oscillating lever 174 and the engagement of the oscillating gear 166 with the first rack gear 159 is sustained. As a load upon the oscillating gear 166 is released when the oscillating gear 166 is separated from the first rack gear 159, torque transmitted to the oscillating lever 174 supported by the supporting shaft 173 of the first and second transmission gears 171 and 172 via the friction member is reduced and the oscillating lever 174 is held in a position in which the oscillating gear 166 is separated from the first rack gear 159.

When the ejection regulating lever 151 is moved to a position in which the turned part 152 is protruded between the first and second ejection levers 61 and 30, it is pressed and moved in the direction shown by the arrow $H_1$ in FIG. 14 by pressure from the toggle spring 165 and is held in a state in which movement in the direction shown by the arrow $H_2$ in FIG. 15 is prevented. That is, the ejection regulating lever is held in a state in which the turned part 152 is protruded between the first and second ejection levers 61 and 30.

When the first ejection lever 61 is moved in the direction shown by the arrow K in FIG. 14, the second ejection lever 30 is moved in the direction shown by the arrow K in FIG. 14 via the turned part 152 of the ejection regulating lever 151, the lock of the cover 29 is released, the disc cartridge 210 or 232 held in the cartridge holder 9 is ejected from the cartridge set part 7 and the magneto-optical disc 211 or the optical disc 232 loaded on to the disc table 6 is ejected.

In the meantime, even if the turned part 152 is pressed in the direction shown by the arrow $H_2$ in FIG. 14 in a state in which the turned part 152 is protruded between the first and second ejection levers 61 and 30, the ejection regulating lever 151 is moved in the direction shown by the arrow $H_1$ in FIG. 14 by pressure from the toggle spring 165 and is returned to a state in which the turned part 152 is protruded between the first and second ejection levers 61 and 30. That is, as the toggle spring 165 cannot be moved to a position exceeding a neutral point thereof by pressing the turned part 152 in the direction shown by the arrow $H_2$ in FIG. 14, the ejection regulating lever 151 is automatically returned to a position in which the turned part 152 is protruded between the first and second ejection levers 61 and 30 by pressure from the toggle spring 165. Therefore, when the ejection regulating lever 151 is located in a position in which the turned part 152 is protruded between the first and second ejection levers 61 and 30, the toggle spring 165 securely holds a state in which ejection is enabled. Therefore, according to this embodiment, the secure ejection of the disc cartridge 210 or 232 utilizing a small number of springs is guaranteed.

In the above embodiment, an example in which the present invention is applied to a disc recorder/reproducer using an optical disc or a magneto-optical disc as a recording medium is described, however, the present invention can be widely applied to a disc recorder and/or reproducer using a magnetic disc, a disclike recording medium other than magnetic disc or a disc cartridge housing this recording medium and advantages can be obtained by the present invention.

According to the present invention, a variety of changes may be made depending on the type of a disc recorder and/or reproducer to which the present invention is applied. Changes may be made in the range in which they do not deviate from the effect of the present invention.

Industrial Applicability

As a disc ejecting apparatus and a disc loading apparatus according to the present invention are characterized by the operation of an ejection mechanism for ejecting a disc cartridge in a state in which a disc housed in this disc cartridge is loaded onto a disc rotating mechanism that is controlled utilizing the motor of the disc rotating mechanism for rotating a disc table onto which the disc in the disc cartridge is loaded for rotating a disc housed in a disc cartridge, a driving source can be reduced and the ejecting apparatus and the loading apparatus can be simplified and miniaturized.

What is claimed is:

1. A disc cartridge loading apparatus comprising:

disc rotating means provided with a disc table onto which a disc in a disc cartridge is loaded for rotating said disc housed in said disc cartridge and a motor for rotating said disc table;

a holder moved between a loading position in which said disc held in said disc cartridge is loaded onto said disc rotating means and a separating position in which said disc is separated from said disc rotating means for holding said disc cartridge;

a body in which said disc rotating means is arranged so that said holder can be moved between said loading position in which said disc is loaded and said separating position in which said disc is separated from said disc rotating means;

a cover moved together with said holder between a first position in which said disc cartridge can be inserted into said holder when said holder is located in said separating position in which said disc is separated from said disc rotating means and a second position in which an end of said holder from which said disc cartridge is inserted is closed when said holder is located in said loading position wherein said disc is loaded;

holding means for holding said cover in said second position;

operating means for causing said holding means to release said cover; and switching means for prohibiting said operating means from causing said holding means to release said cover when said motor is normally operated and for enabling said operating means to cause said holding means to release said cover when said motor is reversely rotated, wherein said switching means is provided with transmission means arranged between said operating means and said holding means for releasing said cover held by said holding means by operation of said operating means; and said switching means selectively operates said transmission means between a transmission position in which an operation of a first election lever is transmitted to a second ejection lever and a nontransmission position in which the operation of said first election lever is not transmitted to said second election lever, wherein said switching means is provided with a toggle spring for pressing said transmission means in a direction of said transmission position when said transmission means is located in said transmission position and for pressing said transmission means in a direction of said nontransmission position when said transmission means is located in said nontransmission position, and said switching means is provided with a movement mechanism for moving said transmission means by a driving force supplied when said motor is reversely rotated against pressure from said toggle spring, and said movement mechanism is provided with an oscillating gear oscillated depending upon a rotational direction of said motor;

said transmission means is provided with a first lever which is moved between said transmission position and said nontransmission position and to which a first rack engaged with said oscillating gear is provided;

said oscillating gear is oscillated depending upon the rotational direction of said motor; and said oscillating gear and the first rack of said first lever are selectively engaged and said lever is moved between said transmission position and said nontransmission position, wherein said oscillating gear is engaged with the first rack of said first lever when said motor is reversely rotated and moves said first lever in the direction of said transmission position, and wherein:

said movement mechanism is provided with a second lever provided with a second rack engaged with said oscillating gear when said motor is normally rotated and a link mechanism for moving said second lever between said transmission position and said nontransmission position; and said second lever is moved to said nontransmission position by said link mechanism by engaging said second rack and said oscillating gear when said motor is normally rotated.

2. The disc cartridge loading apparatus according to claim 1, wherein:

a gear is formed along a periphery of said disc table; and said movement mechanism is provided with a transmission gear for transmitting a driving force to said oscillating gear engaged with said gear.

* * * * *